(12) United States Patent
Mukae

(10) Patent No.: US 12,351,345 B2
(45) Date of Patent: Jul. 8, 2025

(54) SPACE INFORMATION RECORDER, COLLISION AVOIDANCE ASSISTANCE SYSTEM, SSA BUSINESS DEVICE, AND OPEN ARCHITECTURE DATA REPOSITORY

(71) Applicant: Mitsubishi Electric Corporation, Tokyo (JP)

(72) Inventor: Hisayuki Mukae, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 229 days.

(21) Appl. No.: 17/793,931

(22) PCT Filed: Mar. 9, 2021

(86) PCT No.: PCT/JP2021/009111
§ 371 (c)(1),
(2) Date: Jul. 20, 2022

(87) PCT Pub. No.: WO2021/182425
PCT Pub. Date: Sep. 16, 2021

(65) Prior Publication Data
US 2022/0402635 A1 Dec. 22, 2022

(30) Foreign Application Priority Data
Mar. 10, 2020 (JP) ................. 2020-040879

(51) Int. Cl.
*B64G 3/00* (2006.01)
*B64G 1/24* (2006.01)
*B64G 1/10* (2006.01)

(52) U.S. Cl.
CPC ............. *B64G 3/00* (2013.01); *B64G 1/2429* (2023.08); *B64G 1/1081* (2023.08)

(58) Field of Classification Search
CPC ...... B64G 3/00; B64G 1/1081; B64G 1/1085; B64G 1/2429; B64G 1/68
See application file for complete search history.

(56) References Cited

U.S. PATENT DOCUMENTS 8,882,048 B2 * 11/2014 Levin ............... B64G 1/648
244/172.4
11,780,612 B1 * 10/2023 Kopardekar ............ H04W 4/46
701/13

(Continued)

FOREIGN PATENT DOCUMENTS

| CN | 115600407 A | * | 1/2023 | |
| JP | 2017-114159 A | | 6/2017 | |
| WO | WO-2022046350 A9 | * | 4/2022 | ............... B64G 3/00 |

OTHER PUBLICATIONS

David D. Murakami et al: "Space Traffic Management with a NASA UAS Traffic Management (UTM) Inspired Architecture", AIAA SCITECH 2019 Forum; Jan. 7-11, 2019; San Diego, California, USA, vol. AIAA 2019-2004, Jan. 6, 2019 (Jan. 6, 2019), pp. 1-27, XP055726298, Reston, Virginia DOI: 10.2514/6.2019-2004, ISBN: 978-1-62410-578-4.

(Continued)

*Primary Examiner* — Peter D Nolan
*Assistant Examiner* — Peter Y Ning
(74) *Attorney, Agent, or Firm* — XSENSUS LLP

(57) ABSTRACT

A space information recorder (100) acquires space object information (500), which is orbit forecast information of a plurality of space objects (60), from a management business device (40) used by a management business operator that manages the plurality of space objects (60), and records the space object information (500). The space object information (500) includes a forecast epoch, a forecast orbital element, and a forecast error of each of the plurality of space objects (60). When it is foreseen that a space object A (Continued)

included in the plurality of space objects (60) will intrude into a range at orbital altitudes of 300 km to 1000 km in which a satellite group of LST 10:00 to 11:00 is present, a time period from intrusion to exit and orbit forecast information are recorded.

26 Claims, 27 Drawing Sheets

(56) References Cited

U.S. PATENT DOCUMENTS

| | | | |
|---|---|---|---|
| 2015/0134295 A1* | 5/2015 | Kim | B64G 1/242 |
| | | | 702/152 |
| 2018/0370658 A1 | 12/2018 | Amimoto et al. | |
| 2021/0078735 A1* | 3/2021 | Kapp | G06N 20/00 |

OTHER PUBLICATIONS

Extended European Search Report (EESR) dated Jul. 11, 2023 for the corresponding EP application No. 21768351.5, 13pp.
International Search Report and Written Opinion mailed on Jun. 1, 2021, received for PCT Application PCT/JP2021/009111, filed on Mar. 9, 2021, 10 pages including English Translation.

\* cited by examiner

Fig. 10

| | | | | | | | | | | | |
|---|---|---|---|---|---|---|---|---|---|---|---|
| | | 511: SPACE OBJECT ID | 512: FORECAST EPOCH | 513: FORECAST ORBITAL ELEMENTS | | | | | | 514: FORECAST ERROR | |
| | | | | SIX KEPLERIAN ELEMENTS | | | | | | PREDICTED ERROR | |
| SATELLITE ID | DEBRIS ID | EPOCH | MEAN MOTION | ECCENTRICITY | INCLINATION | RAAN | ARGUMENT OF PERIGEE | MEAN ANOMALY | TRAVELING DIRECTION | ORTHOGONAL DIRECTION | BASIS |
| | | Year and date | Orbits /day | No unit | deg | deg | deg | deg | km | km | |
| A | | a1 | a2 | a3 | a4 | a5 | a6 | a7 | a8 | a9 | IN-ORBIT MEASUREMENT |
| B | | b1 | b2 | b3 | b4 | b5 | b6 | b7 | b8 | b9 | IN-ORBIT MEASUREMENT |
| C | | c1 | c2 | c3 | c4 | c5 | c6 | c7 | c8 | c9 | ANALYSIS |
| D | | d1 | d2 | d3 | d4 | d5 | d6 | d7 | d8 | d9 | GROUND MEASUREMENT |
| E | | e1 | e2 | e3 | e4 | e5 | e6 | e7 | e8 | e9 | GROUND MEASUREMENT |
| F | | f1 | f2 | f3 | f4 | f5 | f6 | f7 | f8 | f9 | SSA MEASUREMENT |
| | α | α1 | α2 | α3 | α4 | α5 | α6 | α7 | α8 | α9 | SSA MEASUREMENT |
| | β | β1 | β2 | β3 | β4 | β5 | β6 | β7 | β8 | β9 | SSA MEASUREMENT |
| | γ | γ1 | γ2 | γ3 | γ4 | γ5 | γ6 | γ7 | γ8 | γ9 | SSA MEASUREMENT |
| | δ | δ1 | δ2 | δ3 | δ4 | δ5 | δ6 | δ7 | δ8 | δ9 | SSA MEASUREMENT |

51: ORBIT FORECAST INFORMATION
52: SATELLITE ORBIT FORECAST INFORMATION
53: DEBRIS ORBIT FORECAST INFORMATION

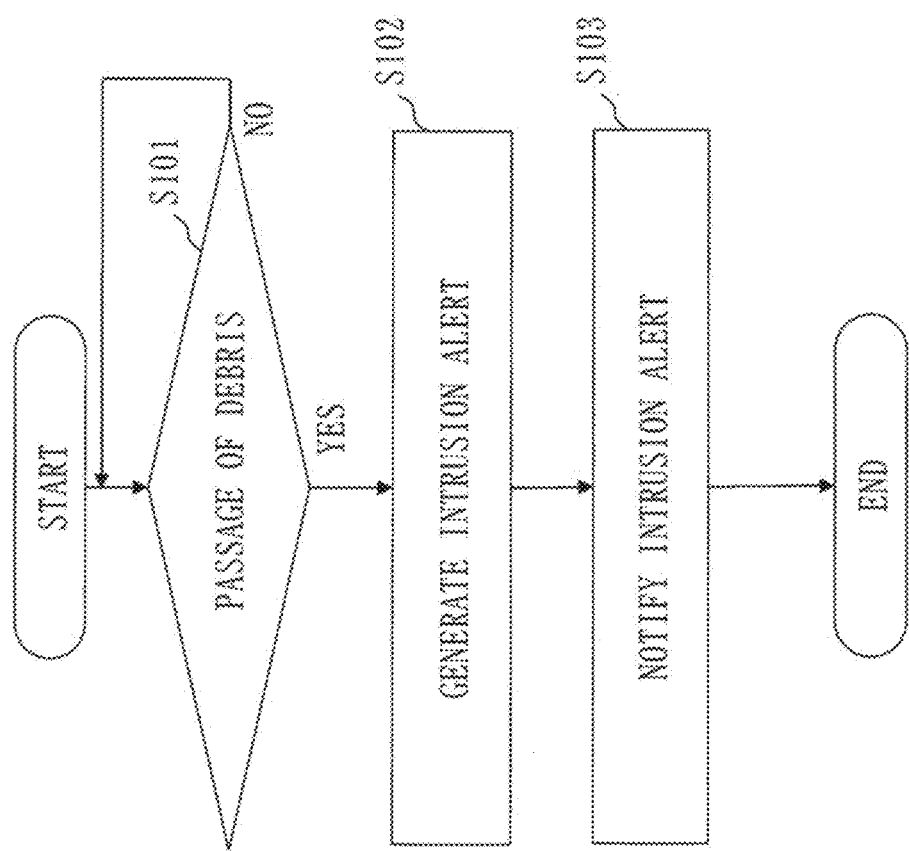

Fig. 13

SPACE INFORMATION RECORDER 100

| SATELLITE GROUP ID | PUBLIC ORBIT INFORMATION 61 (ORBIT FORECAST INFORMATION) | | |
|---|---|---|---|
| | INFORMATION ON CONSTITUENT SATELLITES (TOTAL NUMBER, ID) | ORBITAL ALTITUDE UPPER LIMIT/ LOWER LIMIT | ORBITAL INCLINATION UPPER LIMIT/ LOWER LIMIT |

| SATELLITE ID | ORBIT FORECAST INFORMATION 51 (HIGH-PRECISION ORBIT INFORMATION) | | | | | | | ORBIT RECORD INFORMATION 52 (HIGH-PRECISION ORBIT RECORD INFORMATION) | | | | | | | |
|---|---|---|---|---|---|---|---|---|---|---|---|---|---|---|---|---|
| | | REAL-TIME HIGH-PRECISION ORBIT FORECAST INFORMATION | | | | | | | | | | | | | | |
| | EPOCH | ORBITAL ELEMENTS | PREDICTED ERROR | | INFORMATION PROVIDER BUSINESS DEVICE ID | INFORMATION UPDATE DATE | | | UTS TIME | LOCATION COORDINATES | MEASUREMENT ERROR | | INFORMATION PROVIDER BUSINESS DEVICE ID | INFORMATION UPDATE DATE | | |
| | TIME ERROR | ORBIT RADIUS ERROR | LATITUDE ANGLE ERROR | LONGITUDE ANGLE ERROR | | | VERIFICATION RECORD | | TIME ERROR | ORBIT RADIUS ERROR | LATITUDE ANGLE ERROR | LONGITUDE ANGLE ERROR | | | MEASUREMENT MEANS | |

Fig. 14

| SAT. ID | MEGA-CONSTEL-LATION ID | CONSTEL-LATION ID | DEBRIS ID | SIX KEPLERIAN ELEMENTS | | | | | | | PREDICTED ERROR | | | | VERIFICATION RECORD |
|---|---|---|---|---|---|---|---|---|---|---|---|---|---|---|---|
| | | | | EPOCH | MEAN MOTION | ECCEN-TRICITY | INCLINATION | RAAN | ARGUMENT OF PERIGEE | MEAN ANOMALY | TRAVELING DIRECTION | ORTHOGONAL DIRECTION | ALTITUDE DEVIATION | LST VARIATION | BASIS |
| | | | | Year and date | Orbits /day | No unit | deg | deg | deg | deg | km | km | km | hr | |
| A | | | | a1 | a2 | a3 | a4 | a5 | a6 | a7 | α8 | α9 | | | IN-ORBIT MEASUREMENT | STATISTICALLY VERIFIED |
| B | | | | b1 | b2 | b3 | b4 | b5 | b6 | b7 | β8 | β9 | | | IN-ORBIT MEASUREMENT | VERIFIED ON GROUND |
| C | | | | c1 | c2 | c3 | c4 | c5 | c6 | c7 | δ8 | δ9 | | | IN-ORBIT MEASUREMENT | |
| D | | | A | d1 | d2 | d3 | d4 | d5 | d6 | d7 | δ8 | δ9 | | | ANALYSIS | STATISTICALLY VERIFIED |
| E | | | B | e1 | e2 | e3 | e4 | e5 | e6 | e7 | ε8 | ε9 | | | GROUND MEASUREMENT | |
| F | | | Γ | f1 | f2 | f3 | f4 | f5 | f6 | f7 | ζ8 | ζ9 | | | GROUND MEASUREMENT | |
| | M-A | | Δ | α1 | α2 | α3 | α4 | α5 | α6 | α7 | α8 | α9 | ±Mα8 | | SSA MEASUREMENT | |
| | M-B | | | β1 | β2 | β3 | β4 | β5 | β6 | β7 | β8 | β9 | ±Mβ8 | | SSA MEASUREMENT | |
| | M-C | | | γ1 | γ2 | γ3 | γ4 | γ5 | γ6 | γ7 | γ8 | γ9 | ±Mγ8 | | SSA MEASUREMENT | |
| | M-D | | | Ma1 | Ma2 | Ma3 | Ma4 | Ma5 | Ma6 | Ma7 | | | ±Mа8 | | SSA MEASUREMENT | |
| | M-E | | | Mb1 | Mb2 | Mb3 | Mb4 | Mb5 | Mb6 | Mb7 | | | ±Mb8 | | | |
| | M-F | | | Mc1 | Mc2 | Mc3 | Mc4 | Mc5 | Mc6 | Mc7 | | | ±Mc8 | | | |
| | | | | Md1 | Md2 | Md3 | Md4 | Md5 | Md6 | Md7 | | | ±Md8 | | | |
| | | | | Me1 | Me2 | Me3 | Me4 | Me5 | Me6 | Me7 | | | ±Me8 | | | |
| | | | | Mf1 | Mf2 | Mf3 | Mf4 | Mf5 | Mf6 | Mf7 | | | ±Mf8 | | | |
| | | C-A | | Ca1 | Ca2 | Ca3 | Ca4 | Ca5 | Ca6 | Ca7 | | | ±Ca8 | ±Ca9 | | |
| | | C-B | | Cb1 | Cb2 | Cb3 | Cb4 | Cb5 | Cb6 | Cb7 | | | ±Cb8 | ±Cb9 | | |
| | | C-C | | Cc1 | Cc2 | Cc3 | Cc4 | Cc5 | Cc6 | Cc7 | | | ±Cc8 | ±Cc9 | | |

Fig. 15

| | SATELLITE ID 1 | SATELLITE ID 2 | DEBRIS ID | TIME | LOCATION COORDINATES | | | INTRUSION ALTITUDE |
|---|---|---|---|---|---|---|---|---|
| | | | | | R | AZ | EL | L |
| | | | | | km | deg | deg | km |
| PROXIMITY ALERT | A | | MA | t1 | r1 | az1 | el1 | 100 |
| | B | | MB | t2 | r2 | az2 | el2 | 80 |
| COLLISION ALERT | B | Γ | Δ | t3 | r3 | az3 | el3 | (dθ+θ8) OR LOWER |
| | | | | t4 | r4 | az4 | el4 | (dθ+θ8) OR LOWER |

501 spans R, AZ, EL; 502 covers INTRUSION ALTITUDE.

Fig.16

| | SATELLITE ID1 | DEBRIS ID1 | MEGA-CONSTELLATION ID | CONSTELLATION ID | TIME | LOCATION COORDINATES R km | LOCATION COORDINATES AZ deg | LOCATION COORDINATES EL deg | INTRUSION ALTITUDE H km | INTRUSION LST J hr | INTRUSION LATITUDE RANGE K deg |
|---|---|---|---|---|---|---|---|---|---|---|---|
| INTRUSION ALERT to MEGA-CONSTELLATION | A | | MA | | t1 | r1 | az1 | el1 | Ha | | |
| | | B | MB | | t2 | r2 | az2 | el2 | Hb | | |
| INTRUSION ALERT to CONGESTED ORBIT | B | Γ | A | CA | t3 | r3 | az3 | el3 | Ha | Ja | |
| | | | | CB | t4 | r4 | az4 | el4 | Hb | Jb | |
| INTRUSION ALERT to POLAR/HIGH-LATITUDE ORBIT | C | A | A | CA | t3 | r3 | az3 | el3 | Ha | | Ka |
| | | | | CB | t4 | r4 | az4 | el4 | Hb | | Kb |

519: ORBIT RECORD INFORMATION

| SATELLITE ID | DEBRIS ID | EPOCH Year and date | SIX KEPLERIAN ELEMENTS ||||||| TIME | LOCATION COORDINATES |||
|---|---|---|---|---|---|---|---|---|---|---|---|---|
| | | | MEAN MOTION Orbits/day | ECCENTRICITY No unit | INCLINATION deg | RAAN deg | ARGUMENT OF PERIGEE deg | MEAN ANOMALY deg | | R km | AZ deg | EL deg |
| A | | a1 | a2(actual) | a3(actual) | a4(actual) | a5(actual) | a6(actual) | a7(actual) | ta | ra | aza | ela |
| B | | b1 | b2(actual) | b3(actual) | b4(actual) | b5(actual) | b6(actual) | b7(actual) | tb | rb | azb | elb |
| C | | c1 | c2(actual) | c3(actual) | c4(actual) | c5(actual) | c6(actual) | c7(actual) | tc | rc | azc | elc |
| D | | d1 | d2(actual) | d3(actual) | d4(actual) | d5(actual) | d6(actual) | d7(actual) | td | rd | azd | eld |
| E | | e1 | e2(actual) | e3(actual) | e4(actual) | e5(actual) | e6(actual) | e7(actual) | te | re | aze | ele |
| F | | f1 | f2(actual) | f3(actual) | f4(actual) | f5(actual) | f6(actual) | f7(actual) | tf | rf | azf | elf |
| | A | α1 | α2(actual) | α3(actual) | α4(actual) | α5(actual) | α6(actual) | α7(actual) | tα | rα | azα | elα |
| | B | β1 | β2(actual) | β3(actual) | β4(actual) | β5(actual) | β6(actual) | β7(actual) | tβ | rβ | azβ | elβ |
| | Γ | γ1 | γ2(actual) | γ3(actual) | γ4(actual) | γ5(actual) | γ6(actual) | γ7(actual) | tγ | rγ | azγ | elγ |
| | Δ | δ1 | δ2(actual) | δ3(actual) | δ4(actual) | δ5(actual) | δ6(actual) | δ7(actual) | tδ | rδ | azδ | elδ |
| MA-a | | a1 | a2(actual) | a3(actual) | a4(actual) | a5(actual) | a6(actual) | a7(actual) | ta | ra | aza | ela |
| MB-a | | a1 | a2(actual) | a3(actual) | a4(actual) | a5(actual) | a6(actual) | a7(actual) | ta | ra | aza | ela |
| MC-a | | a1 | a2(actual) | a3(actual) | a4(actual) | a5(actual) | a6(actual) | a7(actual) | ta | ra | aza | ela |
| MD-a | | a1 | a2(actual) | a3(actual) | a4(actual) | a5(actual) | a6(actual) | a7(actual) | ta | ra | aza | ela |
| MD-b | | b1 | b2(actual) | b3(actual) | b4(actual) | b5(actual) | b6(actual) | b7(actual) | tb | rb | azb | elb |
| MD-c | | c1 | c2(actual) | c3(actual) | c4(actual) | c5(actual) | c6(actual) | c7(actual) | tc | rc | azc | elc |
| CA-a | | a1 | a2(actual) | a3(actual) | a4(actual) | a5(actual) | a6(actual) | a7(actual) | ta | ra | aza | ela |
| CB-a | | a1 | a2(actual) | a3(actual) | a4(actual) | a5(actual) | a6(actual) | a7(actual) | ta | ra | aza | ela |
| CC-a | | a1 | a2(actual) | a3(actual) | a4(actual) | a5(actual) | a6(actual) | a7(actual) | ta | ra | aza | ela |

SPACE INFORMATION RECORDER, COLLISION AVOIDANCE ASSISTANCE SYSTEM, SSA BUSINESS DEVICE, AND OPEN ARCHITECTURE DATA REPOSITORY

CROSS-REFERENCE TO RELATED APPLICATIONS

The present application is based on PCT filing PCT/JP2021/009111, filed Mar. 9, 2021, which claims priority to JP 2020-040879, filed Mar. 10, 2020, the entire contents of each are incorporated herein by reference.

TECHNICAL FIELD

The present disclosure relates to a space information recorder, a collision avoidance assistance system, a collision avoidance assistance program, a collision avoidance assistance device, an information management method, a mega-constellation business device, a debris removal business device, a debris removal system, a debris removal program, an SSA business device, a collision avoidance assistance business device, a satellite business device, a constellation business device, a rocket launch business device, a business device, and an open architecture data repository.

BACKGROUND ART

In recent years, large-scale satellite constellations including several hundred to several thousand satellites, which are called mega-constellations, have started to be constructed, and the risk of collision between satellites in orbit is increasing. In addition, space debris such as an artificial satellite that has become uncontrollable due to a failure or rocket debris has been increasing.

With the rapid increase in space objects such as satellites and space debris in outer space as described above, in space traffic management (STM) there is an increasing need to create international rules for avoiding collisions between space objects.

Patent Literature 1 discloses a technology for forming a satellite constellation composed of a plurality of satellites in the same circular orbit.

There is so far a system in which the Combined Space Operations Center (CSpOC) in the United States continues to monitor space objects and issues an alert when proximity or a collision between space objects is foreseen. At a manned space station and in a commercial communications satellite, an avoidance operation is carried out in response to this alert when it is judged necessary.

CITATION LIST

Patent Literature

Patent Literature 1: JP 2017-114159 A

SUMMARY OF INVENTION

Technical Problem

With an increase in debris in outer space, an increase in the number of satellites due to the emergence of mega-constellations, and improvement in ground surveillance capability, it is becoming difficult to continue the existing alert issuance service by the CSpOC in the United States. Space situation awareness (SSA) is required to judge whether debris will intrude into a satellite constellation.

However, Patent Literature 1 does not describe a method for accurately foreseeing that a space object will intrude into a congested area of a satellite constellation.

An object of the present disclosure is to accurately foresee that a space object will intrude into a congested area of a satellite constellation.

Solution to Problem

A space information recorder according to the present disclosure acquires and records space object information, the space object information being acquired from a management business device used by a management business operator that manages a plurality of space objects flying in space and being orbit forecast information of the plurality of space objects,
wherein the space object information includes a forecast epoch, a forecast orbital element, and a forecast error of each of the plurality of space objects, and
wherein when it is foreseen that a space object A included in the plurality of space objects will intrude into a range at orbital altitudes of 300 km to 1000 km in which a satellite group of local sun time (LST) 10:00 to 11:00 is present, the space information recorder records a time period from intrusion to exit and orbit forecast information.

Advantageous Effects of Invention

A space information recorder according to the present disclosure has an effect that it is possible to accurately foresee that a space object will intrude into a congested area of a satellite constellation.

BRIEF DESCRIPTION OF DRAWINGS

FIG. 10 is an example of orbit forecast information according to Embodiment 1;

FIG. 11 is a flowchart of an intrusion alert process by the space information recorder according to Embodiment 1;

FIG. 13 is an example of space object information in the space information recorder according to Embodiment 1;

FIG. 14 is a detailed example of orbit forecast information of the space object information in the space information recorder according to Embodiment 1;

FIG. 15 is an example of a proximity alert and a collision alert in the space object information according to Embodiment 1;

FIG. 16 is an example of the intrusion alert in the space object information according to Embodiment 1;

FIG. 17 is a detailed example of orbit record information of the space object information in the space information recorder according to Embodiment 1;

DESCRIPTION OF EMBODIMENTS

Figure 1:
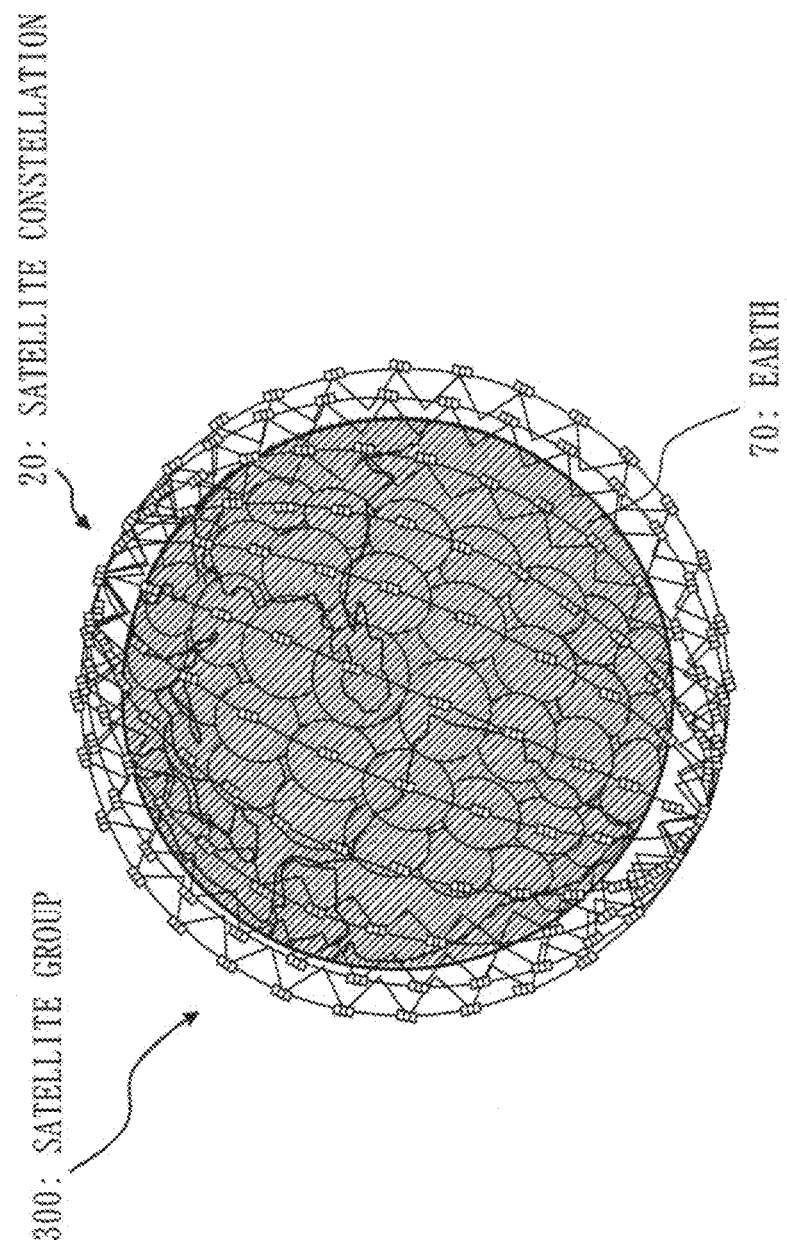
FIG. 1 is an example in which a plurality of satellites cooperatively realize a communication service to the ground over the entire globe of Earth.

Embodiments of the present disclosure will be described hereinafter with reference to the drawings. Throughout the drawings, the same or corresponding parts are denoted by the same reference signs. In the description of the embodiments, description of the same or corresponding parts will be suitably omitted or simplified. In the drawings hereinafter, the relative sizes of components may be different from actual ones. In the description of the embodiments, directions or positions such as "up", "down", "left", "right", "front", "rear", "top side", and "back side" may be indicated. These terms are used only for convenience of description, and are not intended to limit the placement and orientation of components such as devices, equipment, or parts.

Embodiment 1

Examples of a satellite constellation assumed for a space information recorder according to the following embodiments will be described.

FIG. 1 is a diagram illustrating an example in which a plurality of satellites cooperatively realize a communication service to the ground over the entire globe of Earth 70.

FIG. 1 illustrates a satellite constellation 20 that realizes a communication service over the entire globe.

The ground communication service range of each satellite of a plurality of satellites flying at the same altitude in the same orbital plane overlaps the communication service range of a following satellite. Therefore, with such satellites, the satellites in the same orbital plane can provide a communication service to a specific point on the ground in turn in a time-division manner. By providing adjacent orbital planes, a communication service can be provided to the ground with widespread coverage across the adjacent orbits. Similarly, by placing a large number of orbital planes at approximately equal intervals around Earth, a communication service to the ground can be provided over the entire globe.

Figure 2:
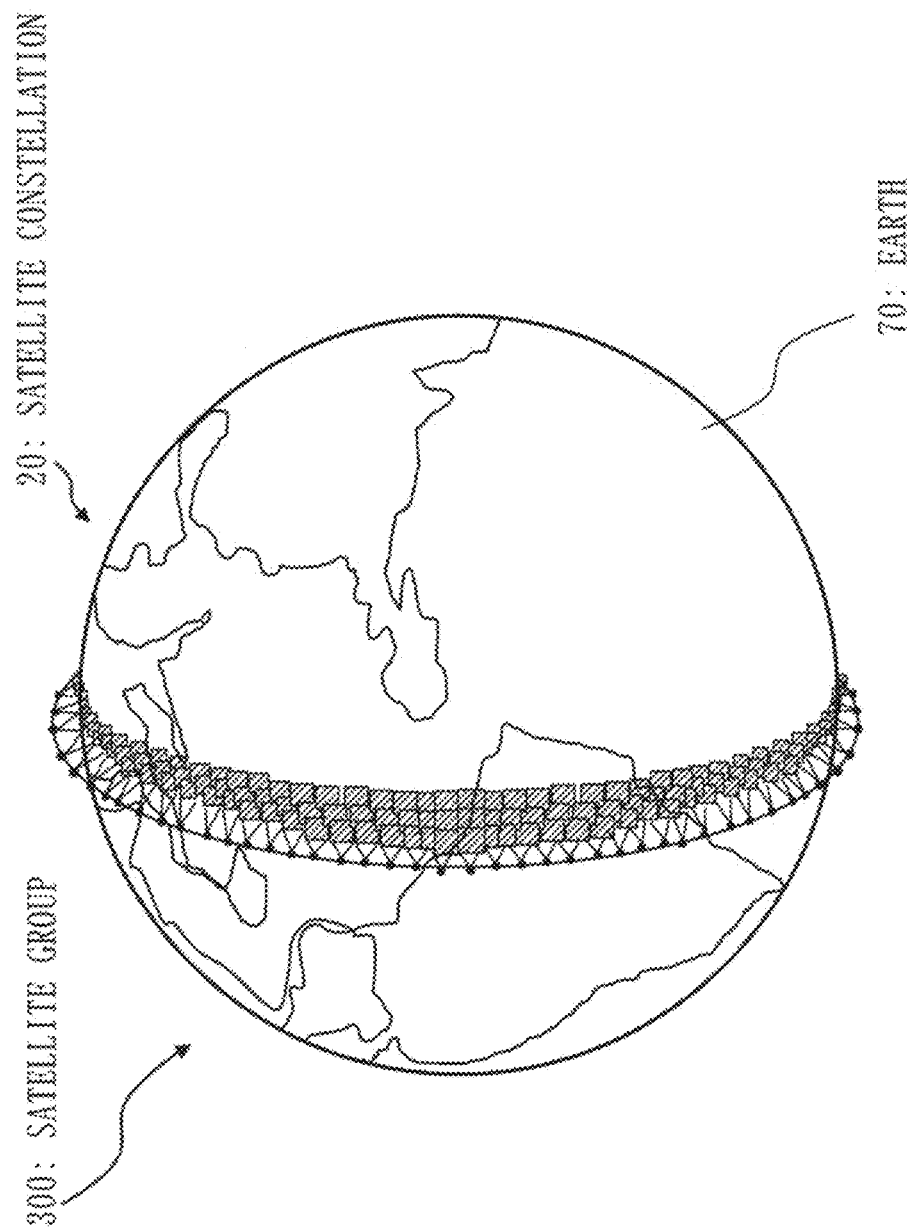
FIG. 2 is an example in which a plurality of satellites in a single orbital plane realize an Earth observation service.

FIG. 2 is a diagram illustrating an example in which a plurality of satellites in a single orbital plane realize an Earth observation service.

FIG. 2 illustrates a satellite constellation 20 that realizes an Earth observation service. In the satellite constellation 20 of FIG. 2, satellites each equipped with an Earth observation device, which is an optical sensor or a radio sensor such as synthetic-aperture radar, fly at the same altitude in the same orbital plane. In this way, in a satellite group 300 in which the ground imaging ranges of successive satellites overlap in a time-delay manner, a plurality of satellites in orbit provide an Earth observation service by capturing ground images in turn in a time-division manner.

As described above, the satellite constellation 20 is formed with the satellite group 300 composed of a plurality of satellites in each orbital plane. In the satellite constellation 20, the satellite group 300 cooperatively provides a service. Specifically, the satellite constellation 20 refers to a satellite constellation formed with one satellite group by a communications business service company as illustrated in FIG. 1 or an observation business service company as illustrated in FIG. 2.

Figure 3:
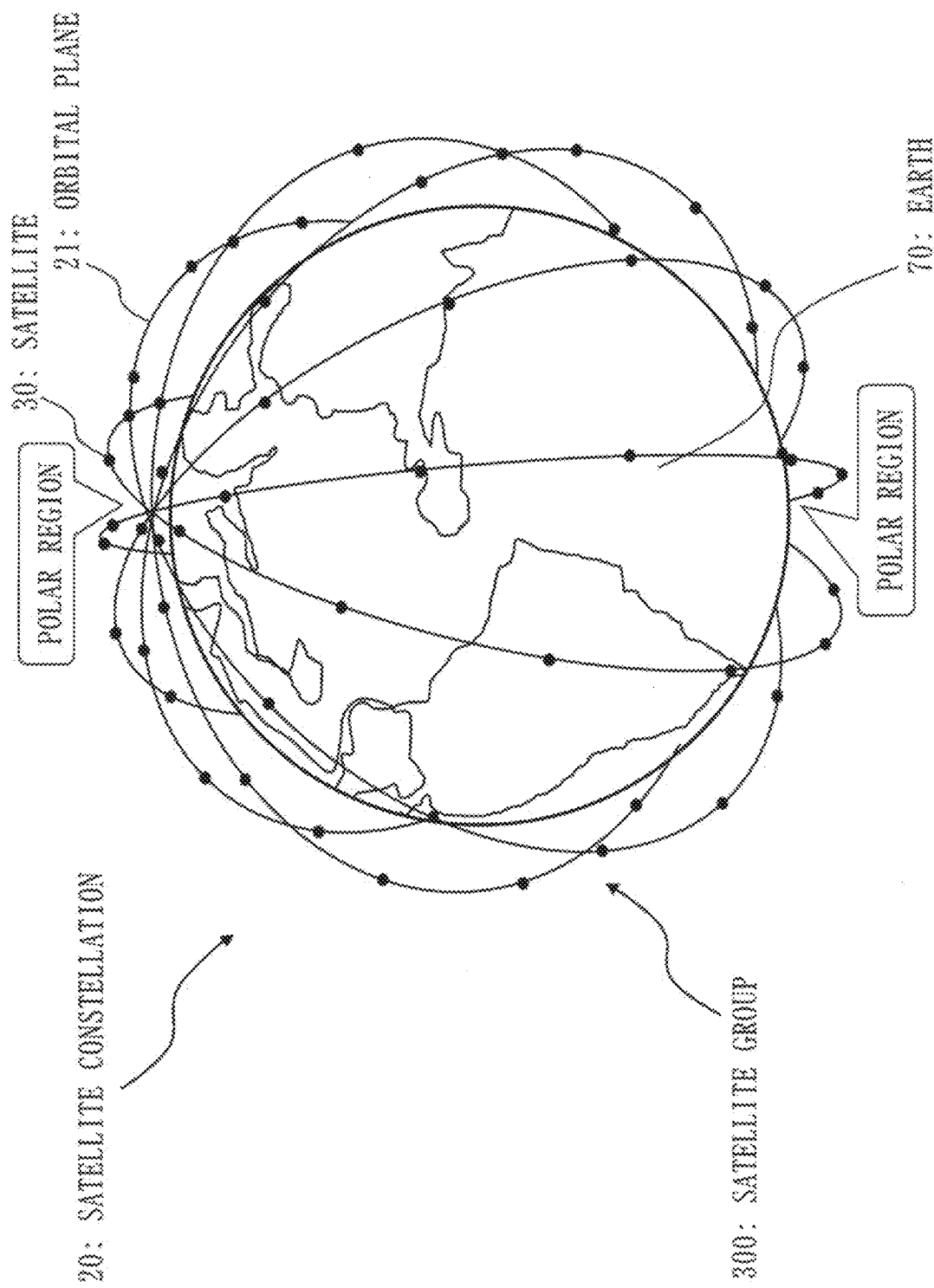
FIG. 3 is an example of a satellite constellation having a plurality of orbital planes that intersect in the vicinity of the polar regions.
Figure 4:
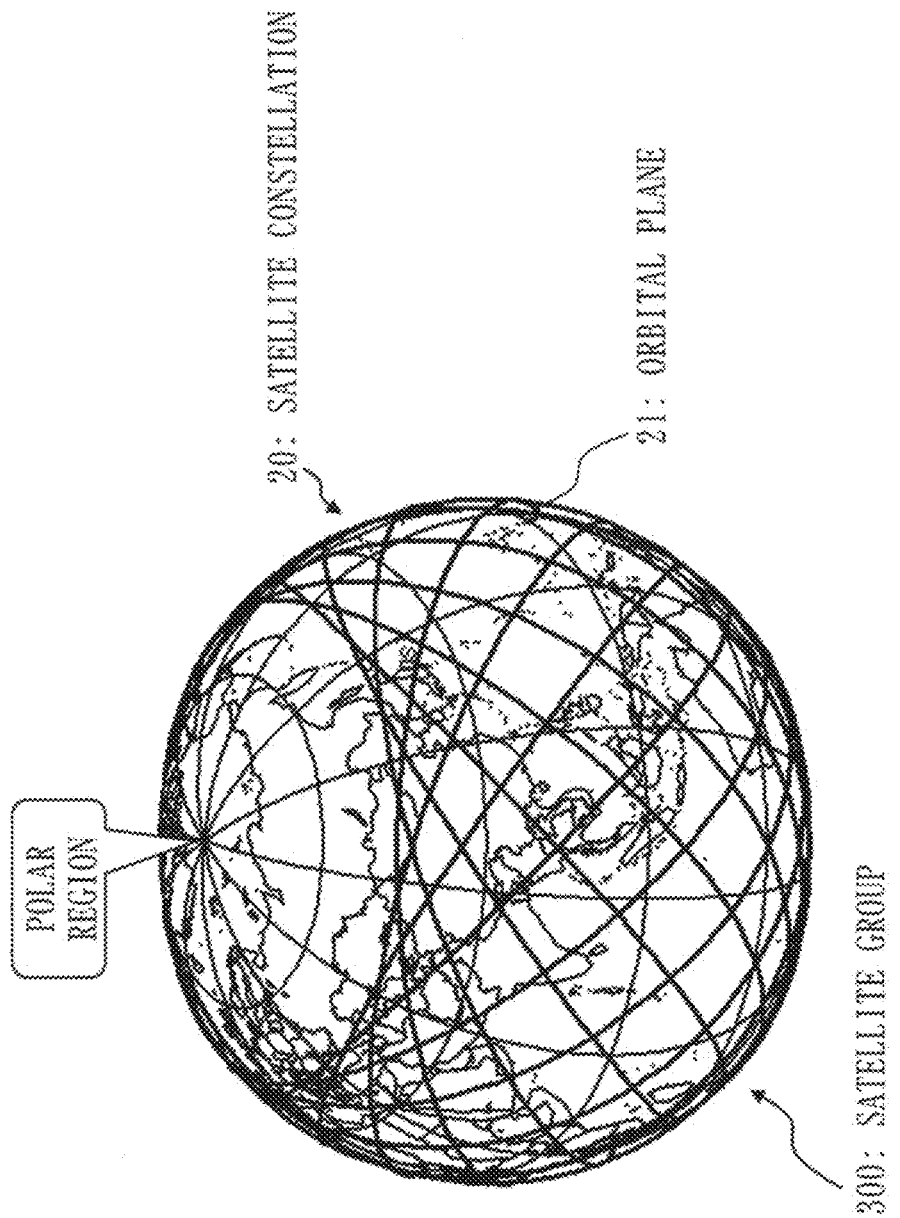
FIG. 4 is an example of a satellite constellation having a plurality of orbital planes that intersect outside the polar regions.

FIG. 3 is an example of a satellite constellation 20 having a plurality of orbital planes 21 that intersect in the vicinity of the polar regions. FIG. 4 is an example of a satellite constellation 20 having a plurality of orbital planes 21 that intersect outside the polar regions.

In the satellite constellation 20 of FIG. 3, the orbital inclination of each of the plurality of orbital planes 21 is about 90 degrees, and the orbital planes 21 exist on mutually different planes.

In the satellite constellation 20 of FIG. 4, the orbital inclination of each of the plurality of orbital planes 21 is not about 90 degrees, and the orbital planes 21 exist on mutually different planes.

In the satellite constellation 20 of FIG. 3, any given two orbital planes intersect at points in the vicinity of the polar regions. In the satellite constellation 20 of FIG. 4, any given two orbital planes intersect at points outside the polar regions. In FIG. 3, a collision between satellites 30 may occur in the vicinity of the polar regions. As illustrated in FIG. 4, the intersection points between the orbital planes each with an orbital inclination greater than 90 degrees move away from the polar regions according to the orbital inclination. Depending on the combinations of orbital planes, orbital planes may intersect at various locations including the vicinity of the equator. For this reason, places where collisions between satellites 30 may occur are diversified. A satellite 30 is referred to also as an artificial satellite.

In particular, in recent years, large-scale satellite constellations including several hundred to several thousand satellites have started to be constructed, and the risk of collision between satellites in orbit is increasing. In addition, space debris such as an artificial satellite that has become uncontrollable due to a failure or rocket debris has been increasing. A large-scale satellite constellation is referred to also as a mega-constellation. Such debris is referred to also as space debris.

As described above, with the increase in debris in outer space and the rapid increase in the number of satellites such as those in a mega-constellation, the need for space traffic management (STM) is increasing.

For orbital transfer of space objects, there has been increasing need for deorbit after completion of a mission in orbit (PMD), or ADR, which causes debris such as a failed satellite or an upper stage of a rocket that is floating to deorbit by external means such as a debris removal satellite. International discussions have begun as STM on the need for such ADR. PMD is an abbreviation for Post Mission Disposal. ADR is an abbreviation for Active Debris Removal. STM is an abbreviation for Space Traffic Management.

With an enhanced framework for space situation awareness (SSA), including international cooperation, and improvement of measurement precision, it has become possible to monitor space objects of smaller sizes. The total number of space objects that can be monitored is also increasing.

A dramatic increase in the number of space objects due to the construction of a mega-constellation is one of causes for increasing risks of collision in outer space. However, assuming that collisions between artificial space objects can be avoided as an effect of artificial activities such as STM, a risk of chain-reaction collision triggered by a collision with debris floating in outer space is still a serious problem.

Even if the debris itself is a minute object, there is a risk that a satellite will be damaged explosively under collision conditions with a high relative velocity, and there is a risk of chain-reaction higher damage caused by scattered pieces of the satellite. As a mega-constellation of a few thousand satellites, a plan of making about 2500 satellites fly at the same altitude has been announced. In steady operation, the mainstream policy is to avoid collisions within a system by performing time management on the flight locations of all satellites. However, if a collision with debris triggers an anomaly to occur in orbital attitude control of one satellite, resulting in deviation from control according to the initial time management, or if pieces of debris scatter, there is a very high risk of collision with other satellites flying at the same orbital altitude.

In order to avoid such a risk of collision, it is rational to manage orbit information of debris and orbit information of a mega-constellation in an integrated manner and perform collision prediction analysis. It is said that debris information of about 20,000 pieces of basketball-sized debris can be monitored in the SSA area. Furthermore, it is said that 200,000 pieces of softball-sized debris can be monitored in the future with improvement in surveillance capability called the Space Fence by the United States.

If an SSA business operator maintains and manages debris information of 200,000 pieces of debris while updating the information, there are many problems in further managing, in an integrated manner, orbit information of 10,000 or more satellites owned by a mega-constellation business operator. For example, when not only orbit prediction based on natural phenomena but also orbital attitude control provided in each satellite is used, its effect needs to be reflected in orbit prediction analysis, which entails a huge amount of work. The mega-constellation business operator may not always disclose the latest and highly precise satellite information to the SSA business operator. The monitoring of 200,000 pieces of debris is by no means a necessary and sufficient scale. Even a minute piece of debris smaller than a softball can have enough potential to destroy a satellite. Therefore, the need to monitor a huge amount of debris of smaller sizes will increase in the future.

It is not realistic for the mega-constellation business operator to perform integrated management including information on as many as 200,000 pieces of debris from the viewpoint of workload and so on. Furthermore, it is not easy to consolidate information of multiple mega-constellation business operators in an integrated manner.

Under the circumstances as described above, it is preferable that the SSA business operator passes debris orbit information to the mega-constellation business operator, and the mega-constellation business operator performs analysis on collisions with satellites in its own system. In a mega-constellation, a few thousand satellites fly at a specific orbital altitude. Therefore, if a predicted time and location of passage through the specific orbital altitude at which the mega-constellation operates and velocity vector information are provided as debris orbit information, the mega-constellation business operator can identify satellites with a risk of collision and perform collision prediction analysis.

Referring to FIGS. 5 to 8, an example of a satellite 30 and a ground facility 700 in a satellite constellation forming system 600 that forms a satellite constellation 20 will be described. For example, the satellite constellation forming system 600 is operated by a business operator that conducts a satellite constellation business, such as a mega-constellation business device 41, an LEO constellation business device 42, or a satellite business device 43.

Figure 5:
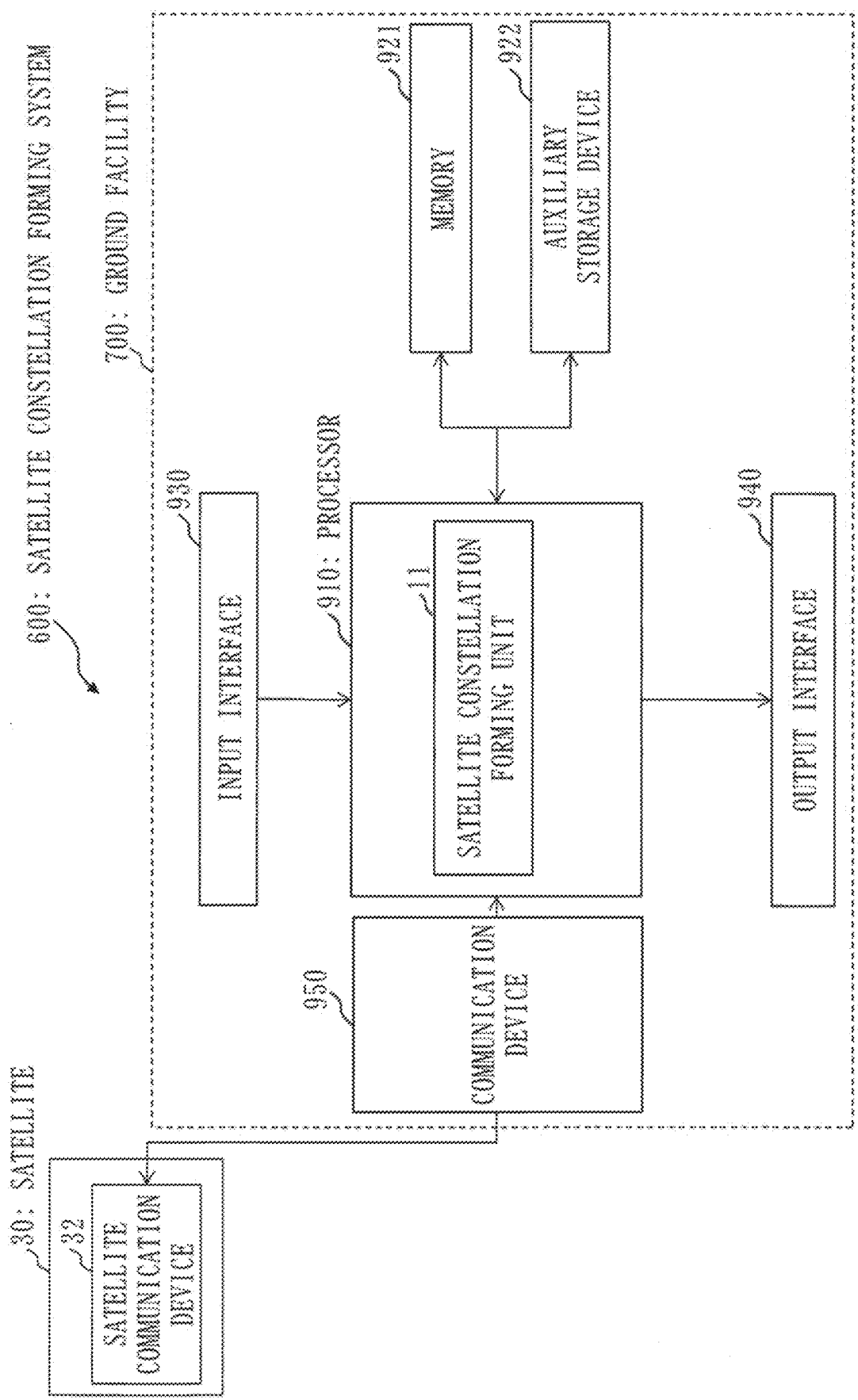
FIG. 5 is a configuration diagram of a satellite constellation forming system.

FIG. 5 is a configuration diagram of the satellite constellation forming system 600.

The satellite constellation forming system 600 includes a computer. FIG. 5 illustrates a configuration with one computer but, in practice, a computer is provided in each satellite 30 of a plurality of satellites constituting the satellite constellation 20 and the ground facility 700 that communicates with each satellite 30. The functions of the satellite constellation forming system 600 are realized cooperatively by the computers provided in each of the satellites 30 and the ground facility 700 that communicates with the satellites 30. In the following, an example of a configuration of the computer that realizes the functions of the satellite constellation forming system 600 will be described.

The satellite constellation forming system 600 includes the satellite 30 and the ground facility 700. The satellite 30 includes a satellite communication device 32 that communicates with a communication device 950 of the ground facility 700. Among the components included in the satellite 30, the satellite communication device 32 is illustrated in FIG. 5.

The satellite constellation forming system 600 includes a processor 910, and also includes other hardware components such as a memory 921, an auxiliary storage device 922, an input interface 930, an output interface 940, and a communication device 950. The processor 910 is connected with other hardware components via signal lines and controls these other hardware components. The hardware of the satellite constellation forming system 600 is substantially the same as the hardware of the ground facility 700 to be described later with reference to FIG. 8.

The satellite constellation forming system 600 includes a satellite constellation forming unit 11 as a functional element. The functions of the satellite constellation forming unit 11 are realized by hardware or software.

The satellite constellation forming unit 11 controls formation of the satellite constellation 20 while communicating with the satellite 30.

Figure 6:
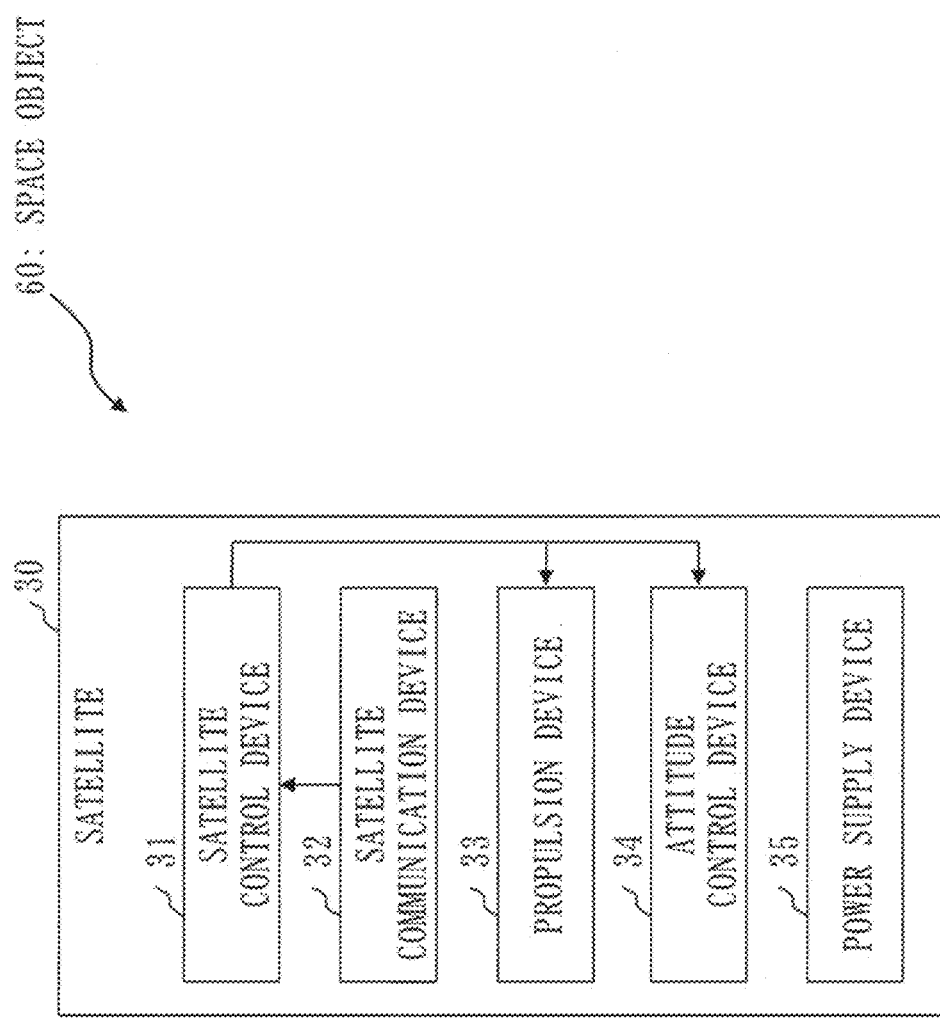
FIG. 6 is a configuration diagram of a satellite of the satellite constellation forming system.

FIG. 6 is a configuration diagram of the satellite 30 of the satellite constellation forming system 600.

The satellite 30 includes a satellite control device 31, the satellite communication device 32, a propulsion device 33, an attitude control device 34, and a power supply device 35. Although other constituent elements that realize various functions are included, the satellite control device 31, the satellite communication device 32, the propulsion device 33, the attitude control device 34, and the power supply device 35 will be described in FIG. 6. The satellite 30 is an example of a space object 60.

The satellite control device 31 is a computer that controls the propulsion device 33 and the attitude control device 34 and includes a processing circuit. Specifically, the satellite control device 31 controls the propulsion device 33 and the attitude control device 34 in accordance with various commands transmitted from the ground facility 700.

The satellite communication device 32 is a device that communicates with the ground facility 700. Specifically, the satellite communication device 32 transmits various types of data related to the satellite itself to the ground facility 700. The satellite communication device 32 also receives various commands transmitted from the ground facility 700.

The propulsion device 33 is a device that provides thrust force to the satellite 30 to change the velocity of the satellite 30. Specifically, the propulsion device 33 is an apogee kick motor, a chemical propulsion device, or an electronic propulsion device. The apogee kick motor (AKM) is an upper-stage propulsion device used for orbital insertion of an artificial satellite, and is also called an apogee motor (when a solid rocket motor is used) or an apogee engine (when a liquid engine is used).

The chemical propulsion device is a thruster using monopropellant or bipropellant fuel. The electronic propulsion device is an ion engine or a Hall thruster. The apogee kick motor is the name of a device used for orbital transfer and may be one type of chemical propulsion device.

The attitude control device 34 is a device to control the attitude of the satellite 30 and attitude elements, such as the angular velocity and the line of sight, of the satellite 30. The attitude control device 34 changes the orientation of each attitude element to a desired orientation. Alternatively, the attitude control device 34 maintains each attitude element in a desired orientation. The attitude control device 34 includes an attitude sensor, an actuator, and a controller. The attitude sensor is a device such as a gyroscope, an Earth sensor, a sun sensor, a star tracker, a thruster, or a magnetic sensor. The actuator is a device such as an attitude control thruster, a momentum wheel, a reaction wheel, or a control moment gyroscope. The controller controls the actuator in accordance with measurement data of the attitude sensor or various commands from the ground facility 700.

The power supply device 35 includes equipment such as a solar cell, a battery, and an electric power control device, and provides electric power to each piece of equipment installed in the satellite 30.

The processing circuit included in the satellite control device 31 will be described.

The processing circuit may be dedicated hardware, or may be a processor that executes programs stored in a memory.

In the processing circuit, some functions may be realized by hardware, and the remaining functions may be realized by software or firmware. That is, the processing circuit can be realized by hardware, software, firmware, or a combination of these.

Specifically, the dedicated hardware is a single circuit, a composite circuit, a programmed processor, a parallel-programmed processor, an ASIC, an FPGA, or a combination of these.

ASIC is an abbreviation for Application Specific Integrated Circuit. FPGA is an abbreviation for Field Programmable Gate Array.

Figure 7:
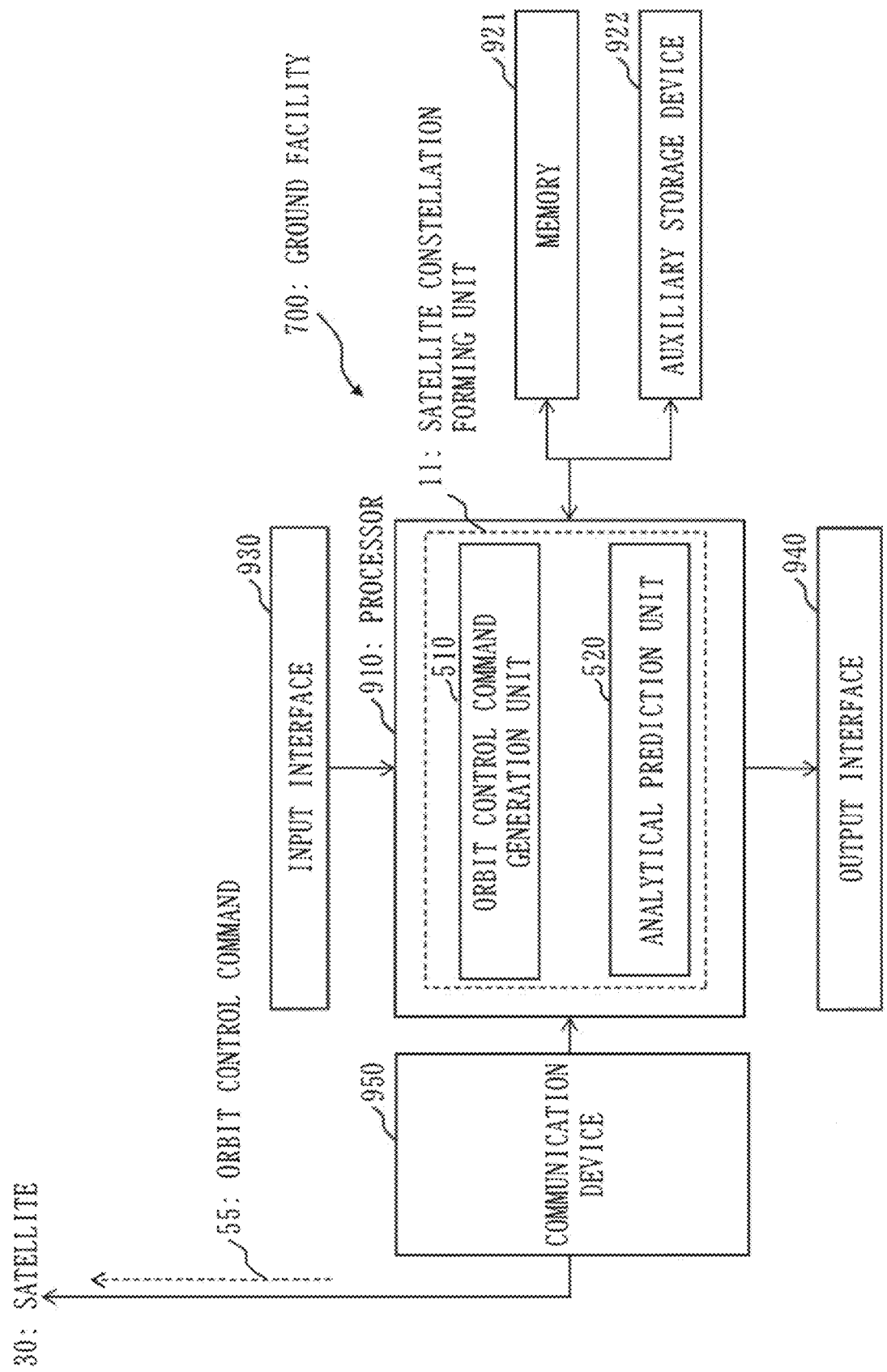
FIG. 7 is a configuration diagram of a ground facility of the satellite constellation forming system.

FIG. 7 is a configuration diagram of the ground facility 700 included in the satellite constellation forming system 600.

The ground facility 700 controls a large number of satellites in all orbital planes by programs. The ground facility 700 is an example of a ground device. The ground device is composed of a ground station, such as a ground antenna device, a communication device connected to a ground antenna device, or an electronic computer, and a ground facility as a server or terminal connected with the ground station via a network. The ground device may include a communication device installed in a mobile object such as an airplane, a self-driving vehicle, or a mobile terminal.

The ground facility 700 forms the satellite constellation 20 by communicating with each satellite 30. The ground facility 700 includes a processor 910 and also includes other hardware components such as a memory 921, an auxiliary storage device 922, an input interface 930, an output interface 940, and a communication device 950. The processor 910 is connected with other hardware components via signal lines and controls these other hardware components. The hardware components of the ground facility 700 will be described later with reference to FIG. 8.

The ground facility 700 includes an orbit control command generation unit 510 and an analytical prediction unit 520 as functional elements. The functions of the orbit control command generation unit 510 and the analytical prediction unit 520 are realized by hardware or software.

The communication device 950 transmits and receives signals for tracking and controlling each satellite 30 in the satellite group 300 constituting the satellite constellation 20. The communication device 950 transmits an orbit control command 55 to each satellite 30.

The analytical prediction unit 520 performs analytical prediction on the orbit of the satellite 30.

The orbit control command generation unit 510 generates an orbit control command 55 to be transmitted to the satellite 30.

The orbit control command generation unit 510 and the analytical prediction unit 520 realize the functions of the satellite constellation forming unit 11. That is, the orbit control command generation unit 510 and the analytical prediction unit 520 are examples of the satellite constellation forming unit 11.

Figure 8:
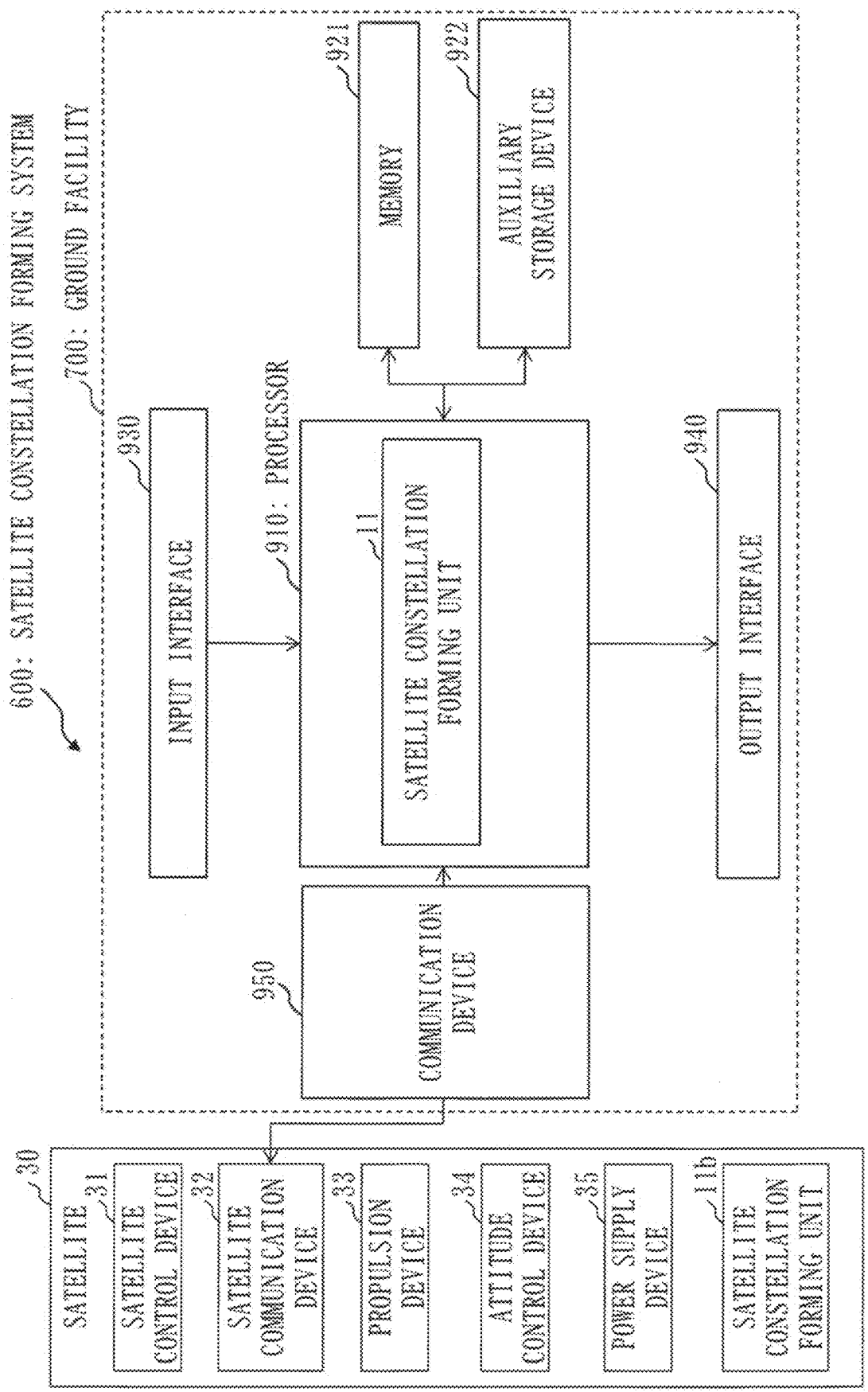
FIG. 8 is an example of a functional configuration of the satellite constellation forming system.

FIG. 8 is a diagram illustrating an example of a functional configuration of the satellite constellation forming system 600.

The satellite 30 further includes a satellite constellation forming unit 11b to form the satellite constellation 20. The functions of the satellite constellation forming system 600 are realized cooperatively by the satellite constellation forming unit 11b included in each satellite 30 of a plurality of satellites and the satellite constellation forming unit 11 included in the ground facility 700. The satellite constellation forming unit 11b of the satellite 30 may be included in the satellite control device 31.

The ground facility 700 includes the processor 910 and also includes other hardware components such as the memory 921, the auxiliary storage device 922, the input interface 930, the output interface 940, and the communication device 950. The processor 910 is connected with other hardware components via signal lines and controls these other hardware components.

The processor 910 is a device that executes programs. The programs are those that realize the functions of the ground facility 700. In FIG. 8, the program that realizes the functions of the ground facility 700 is a satellite constellation forming program to form a satellite constellation.

The processor 910 is an integrated circuit (IC) that performs operational processing. Specific examples of the processor 910 are a central processing unit (CPU), a digital signal processor (DSP), and a graphics processing unit (GPU).

The memory 921 is a storage device to temporarily store data. Specific examples of the memory 921 are a static random access memory (SRAM) and a dynamic random access memory (DRAM).

The auxiliary storage device 922 is a storage device to store data. A specific example of the auxiliary storage device 922 is an HDD. Alternatively, the auxiliary storage device 922 may be a portable storage medium, such as an SD (registered trademark) memory card, CF, a NAND flash, a flexible disk, an optical disc, a compact disc, a Blu-ray (registered trademark) disc, or a DVD. HDD is an abbreviation for Hard Disk Drive. SD (registered trademark) is an abbreviation for Secure Digital. CF is an abbreviation for CompactFlash (registered trademark). DVD is an abbreviation for Digital Versatile Disk.

The input interface 930 is a port to be connected with an input device, such as a mouse, a keyboard, or a touch panel. Specifically, the input interface 930 is a Universal Serial Bus (USB) terminal. The input interface 930 may be a port to be connected with a local area network (LAN).

The output interface 940 is a port to which a cable of a display device 941, such as a display, is to be connected. Specifically, the output interface 940 is a USB terminal or a High Definition Multimedia Interface (HDMI, registered trademark) terminal. Specifically, the display is a liquid crystal display (LCD).

The communication device 950 has a receiver and a transmitter. Specifically, the communication device 950 is a communication chip or a network interface card (NIC).

The programs are read into the processor 910 and executed by the processor 910. The memory 921 stores not only the programs but also an operating system (OS). The processor 910 executes the programs while executing the OS. The programs and the OS may be stored in the auxiliary storage device 922. The programs and the OS that are stored in the auxiliary storage device 922 are loaded into the memory 921 and executed by the processor 910. Part or the entirety of each program may be embedded in the OS.

The ground facility 700 may include a plurality of processors as an alternative to the processor 910. These processors share the execution of programs. Each of the processors is, like the processor 910, a device that executes programs.

Data, information, signal values, and variable values that are used, processed, or output by programs are stored in the memory 921 or the auxiliary storage device 922, or stored in a register or a cache memory in the processor 910.

"Unit" of each unit of the ground facility 700 may be interpreted as "process", "procedure", "means", "phase", or "step". "Process" of a passage determination process, an alert generation process, and an alert notification process may be interpreted as "program", "program product", or "computer readable recording medium recording a program". The terms "process", "procedure", "means", "phase", and "step" can be interpreted interchangeably.

Each program causes a computer to execute each process, each procedure, each means, each phase, or each step, where "unit" of each unit of the ground facility 700 is interpreted as "process", "procedure", "means", "phase", or "step".

Each program may be stored and provided in a computer readable recording medium. Alternatively, each program may be provided as a program product.

Description of Configurations

Figure 9:
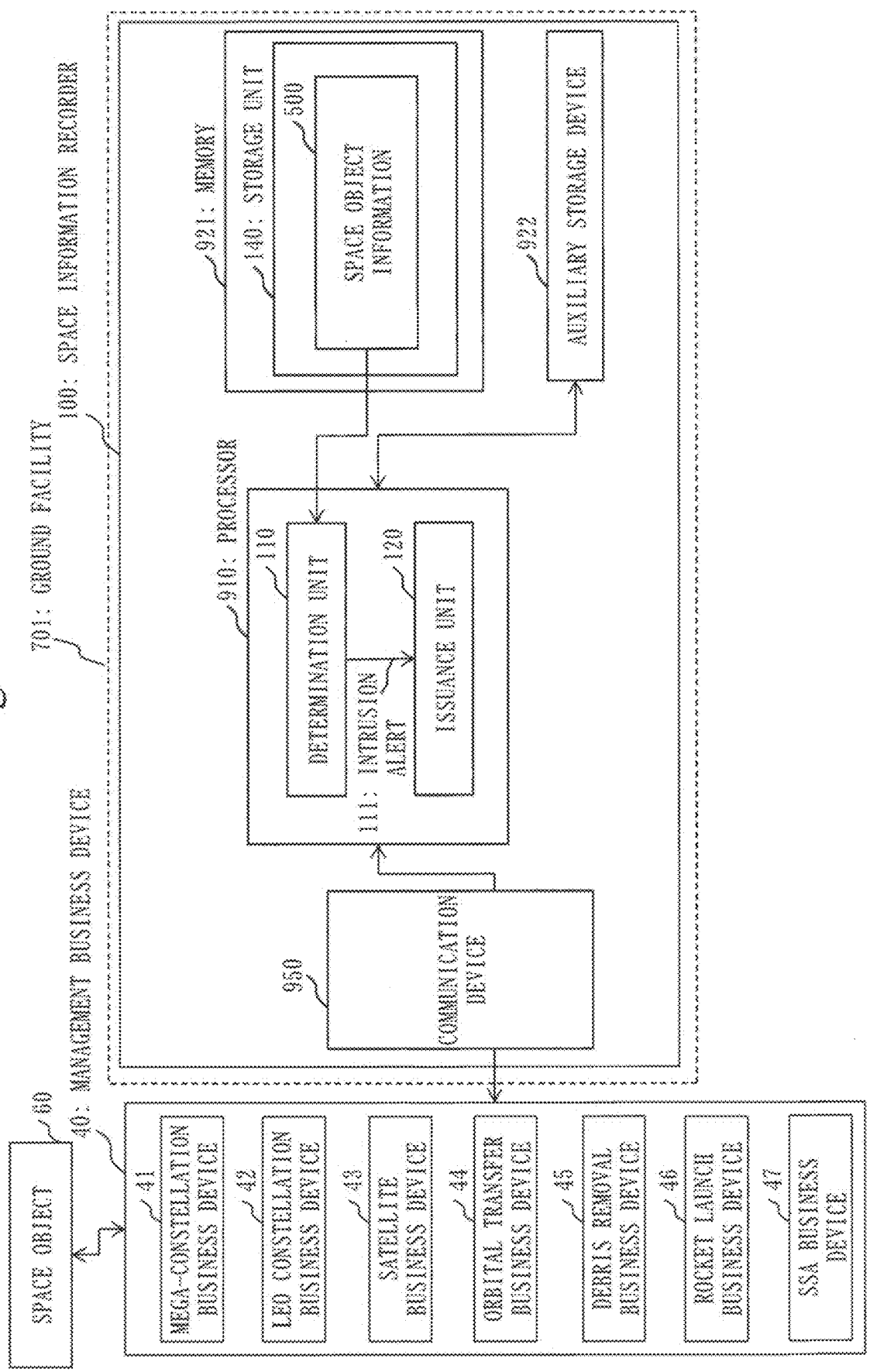
FIG. 9 is an example of a space information recorder according to Embodiment 1.

FIG. 9 is a configuration diagram of a space information recorder 100 according to this embodiment.

The space information recorder 100 communicates with a management business device 40. The space information recorder 100 may be installed in the ground facility 700. Alternatively, the space information recorder 100 may be installed in the satellite constellation forming system 600. Alternatively, the space information recorder 100 may be installed in at least one management business device 40 such as an SSA business device 47. Alternatively, the space information recorder 100 may be installed in an orbit analysis service business operator.

The management business device 40 provides information related to space objects 60 such as artificial satellites or debris. The management business device 40 is a computer of a business operator that collects information related to the space objects 60 such as artificial satellites or debris.

The management business device 40 includes devices such as the mega-constellation business device 41, the LEO constellation business device 42, the satellite business device 43, an orbital transfer business device 44, a debris removal business device 45, a rocket launch business device 46, and the SSA business device 47. LEO is an abbreviation for Low Earth Orbit.

The mega-constellation business device 41 manages a mega-constellation composed of 100 or more satellites. The mega-constellation business device 41 is a computer of a mega-constellation business operator that conducts a large-scale constellation, that is, mega-constellation business.

The LEO constellation business device 42 is a computer of an LEO constellation business operator that conducts a low Earth orbit constellation, that is, LEO constellation business.

The satellite business device 43 is a computer of a satellite business operator that handles one to several satellites.

The orbital transfer business device 44 is a computer of an orbital transfer business operator that performs a space object intrusion alert for a satellite.

The debris removal business device 45 is a computer of a debris removal business operator that conducts a debris retrieval business.

The rocket launch business device 46 is a computer of a rocket launch business operator that conducts a rocket launch business.

The SSA business device 47 is a computer of an SSA business operator that conducts an SSA business, that is, a space situation awareness business.

The management business device 40 may be a device other than the above, provided that it is the device that collects information on space objects such as artificial satellites or debris, and provides the collected information to the space information recorder 100. When the space information recorder 100 is installed on an SSA public server, the space information recorder 100 may be configured to function as the SSA public server.

The information provided from the management business device 40 to the space information recorder 100 will be described in detail later.

The space information recorder 100 includes a processor 910 and also includes other hardware components such as a memory 921, an auxiliary storage device 922, and a communication device 950.

The space information recorder 100 includes, as functional elements, a determination unit 110, an issuance unit 120, and a storage unit 140. In the storage unit 140, orbit forecast information 51 is stored.

The functions of the determination unit 110 and the issuance unit 120 are realized by software or hardware. The storage unit 140 is provided in the memory 921. Alternatively, the storage unit 140 may be provided in the auxiliary storage device 922. Alternatively, the storage unit 140 may be divided and provided in the memory 921 and the auxiliary storage device 922.

FIG. 10 is a diagram illustrating an example of the orbit forecast information 51 included in space object information 500 according to this embodiment.

The space information recorder 100 stores, in the storage unit 140, the orbit forecast information 51 in which forecast values of orbits of space objects 60 are set. For example, the space information recorder 100 may acquire forecast values of the orbit of each of space objects 60 from the management business device 40 used by a management business operator that manages the space objects 60 and store them as the orbit forecast information 51. Alternatively, the space information recorder 100 may acquire the orbit forecast information 51 in which forecast values of the orbit of each of the space objects 60 are set from the management business operator and store it in the storage unit 140.

The management business operator is a business operator that manages space objects 60 that fly in space, such as a satellite constellation, various types of satellites, rockets, and debris. As described above, the management business device 40 used by each management business operator is a computer such as the mega-constellation business device 41, the LEO constellation business device 42, the satellite business device 43, the orbital transfer business device 44, the debris removal business device 45, the rocket launch business device 46, or the SSA business device 47.

The orbit forecast information 51 includes satellite orbit forecast information 52 and debris orbit forecast information 53. In the satellite orbit forecast information 52, forecast values of the orbits of satellites are set. In the debris orbit forecast information 53, forecast values of the orbits of debris are set. In this embodiment, it is arranged that the satellite orbit forecast information 52 and the debris orbit forecast information 53 are included in the orbit forecast information 51. However, the satellite orbit forecast information 52 and the debris orbit forecast information 53 may be stored in the storage unit 140 as separate pieces of information.

In the orbit forecast information 51, information such as a space object identifier (ID) 511, a forecast epoch 512, forecast orbital elements 513, and a forecast error 514 is set.

The space object ID 511 is an identifier that identifies a space object 60. In FIG. 10, a satellite ID and a debris ID are set as the space object ID 511. Specifically, a space object is an object such as a rocket launched into outer space, an artificial satellite, a space station, a debris removal satellite, a planetary space probe, or a satellite or rocket that has become debris after completing a mission.

The forecast epoch 512 is an epoch that is forecast for the orbit of each of the space objects.

The forecast orbital elements 513 are orbital elements that identify the orbit of each of the space objects. The forecast orbital elements 513 are orbital elements that are forecast for the orbit of each of the space objects. In FIG. 10, the six Keplerian elements are set as the forecast orbital elements 513.

The forecast error 514 is an error that is forecast for the orbit of each of the space objects. In the forecast error 514, a travelling direction error, an orthogonal direction error, and a basis for the error are set. In this way, the forecast error 514 explicitly indicates the amount of error included in a record value together with the basis. The basis for the amount of error includes at least one or all of means for measurement, the content of data processing performed as means for improving the precision of location coordinate information, and a result of statistical evaluation on past data.

In the orbit forecast information 51 according to this embodiment, the forecast epoch 512 and the forecast orbital elements 513 are set for the space object 60. Using the forecast epoch 512 and the forecast orbital elements 513, the time and location coordinates of the space object 60 in the near future can be obtained. For example, the time and location coordinates of the space object 60 in the near future may be set in the orbit forecast information 51.

As described above, the orbit forecast information 51 includes information on the orbit of each space object including the epoch and orbital elements or the time and location coordinates, and explicitly indicates forecast values of the space object 60 in the near future.

Description of Operation

FIG. 11 is a flowchart of an intrusion alert process by the space information recorder 100 according to this embodiment.

Figure 12:
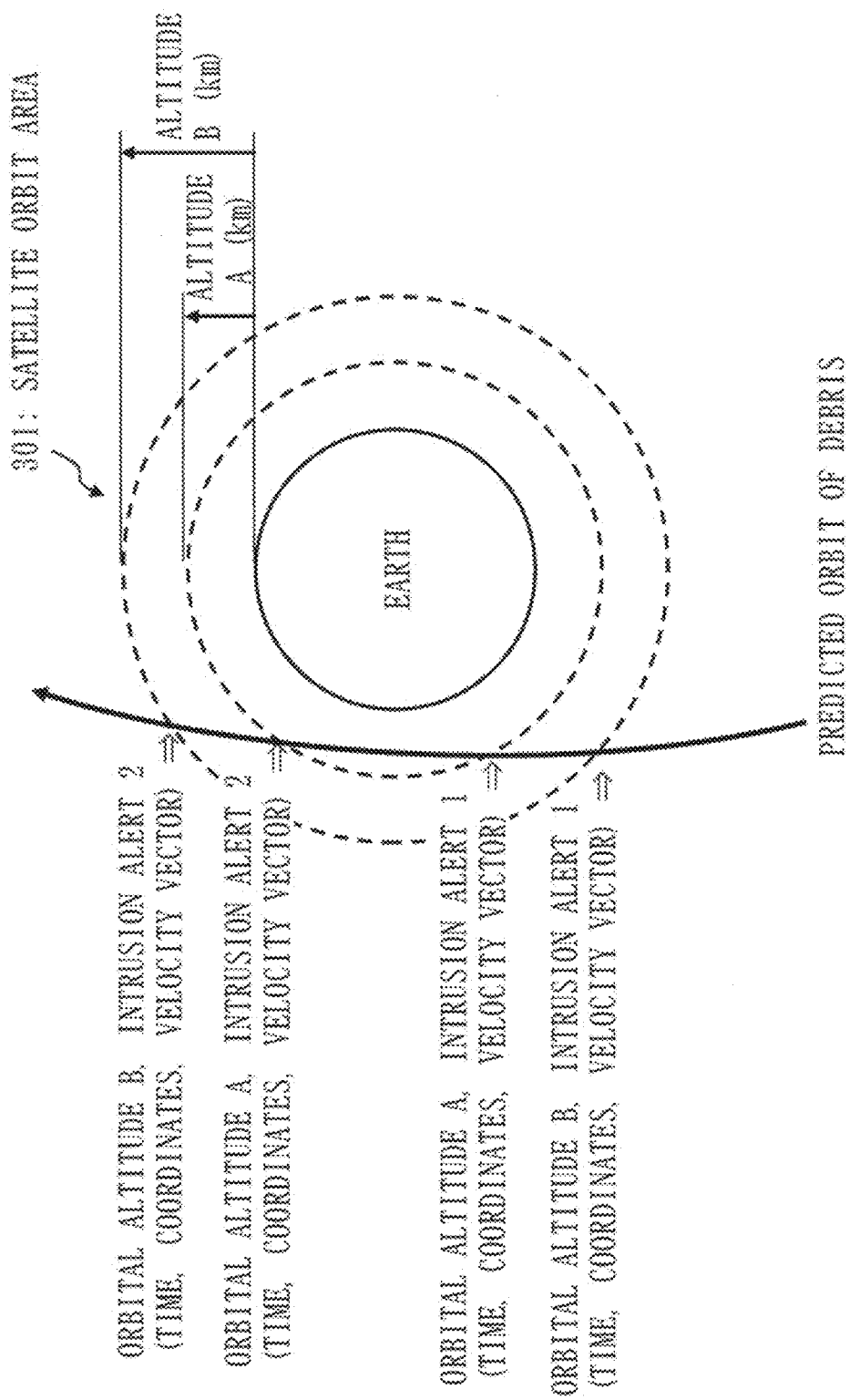
FIG. 12 is an example of a predicted orbit of debris that passes through a satellite constellation and an intrusion alert according to Embodiment 1.

FIG. 12 is a diagram illustrating an example of a predicted orbit of debris that passes through the satellite constellation 20 and an intrusion alert 111 according to this embodiment.

<Operation of Space Object Intrusion Alert Process S100>

In step S101, the determination unit 110 determines whether debris will pass through a satellite orbit area 301, which is an orbit or an area where a plurality of satellites constituting the satellite constellation 20 fly, based on the satellite orbit forecast information 52 and the debris orbit forecast information 53. Specifically, the satellite orbit area 301 is an orbit where the satellite constellation 20 is formed. If it is determined that debris will pass through the satellite orbit area 301, the process proceeds to step S102. If it is not determined that debris will pass through a satellite orbit area, the process of step S101 is repeated.

In step S102, the determination unit 110 generates an intrusion alert 111 including a predicted time, predicted location coordinates, and predicted velocity vector information that relate to passage of the debris.

FIG. 12 illustrates a situation in which debris passes through the satellite orbit area 301 where a satellite constellation A at an orbital altitude of A km and a satellite constellation B at an orbital altitude of B km are formed. The determination unit 110 determines whether a predicted orbit of debris passes through a satellite constellation, based on the satellite orbit forecast information 52 and the debris orbit forecast information 53. In FIG. 12, an entrance to and an exit from the satellite constellation A and an entrance to and an exit from the satellite constellation B are passage points of the satellite constellation 20.

The determination unit 110 generates the intrusion alert 111 including a time, coordinates, and a velocity vector that are predicted for passage at each of these four passage points.

In step S103, the issuance unit 120 notifies the intrusion alert 111 to the management business device 40 used by the management business operator that manages the satellites that fly in the satellite orbit area 301. Specifically, the issuance unit 120 notifies the intrusion alert to the satellite constellation business device used by the satellite constellation business operator that operates the satellite constellation. The satellite constellation business device is a business device of a business operator that conducts a satellite constellation business such as the mega-constellation business device 41, the LEO constellation business device 42, or the satellite business device 43.

<Collision Avoidance by the Satellite Constellation Forming System>

The satellite constellation forming system 600 described with reference to FIGS. 5 to 8 controls the satellite constellation 20 so as to avoid debris that intrudes into the satellite constellation 20, based on the intrusion alert 111 by the space information recorder 100.

As illustrated in FIGS. 5 to 8, the satellite constellation forming system 600 may be installed in the ground facility 700. In this case, the ground facility 700 controls an avoidance action for avoiding collisions between debris that intrudes into the satellite orbit area 301 and the satellites constituting the satellite constellation 20, based on the intrusion alert 111 by the space information recorder 100.

With the satellite constellation forming system 600, the satellite constellation business operator can operate to avoid collisions without significantly disturbing the relative positional relationship among all satellites at least by a method such as accelerating or decelerating all the satellites at the same time. Therefore, the satellite constellation forming system 600 can avoid collisions with debris by the intrusion alert 111 according to this embodiment.

<Description of Detailed Functions of the Space Information Recorder 100>

From the management business device 40 used by the management business operator that manages a plurality of space objects flying in space, the space information recorder 100 acquires the space object information 500, which is the orbit forecast information 51 of the plurality of space objects, and records the space object information 500.

The space object information 500 includes the forecast epoch 512, the forecast orbital elements 513, and the forecast error 514 of each of the plurality of space objects.

FIG. 13 is an example of the space object information 500 in the space information recorder 100 according to this embodiment.

FIG. 14 is a detailed example of the orbit forecast information 51 of the space object information 500 in the space information recorder 100 according to this embodiment.

FIG. 15 is an example of a proximity alert 501 and a collision alert 502 in the space object information 500 according to this embodiment.

FIG. 16 is an example of intrusion alerts 503, 504, and 505 in the space object information 500 according to this embodiment.

In FIG. 14, information related to satellite IDs A, B, C, D, E, and F is provided by a management business operator 40a such as, for example, a satellite business operator, an SSA business operator, a rocket business operator, a debris removal business operator, or an orbital transfer business operator. Information related to debris IDs A, B, Γ, and Δ is provided by a management business operator 40b such as, for example, a satellite business operator, an SSA business operator, or a rocket business operator.

In FIG. 14, it is indicated that information related to mega-constellation IDs M-A, M-B, and M-C is provided by a mega-constellation business operator 40c. It is also indicated that information related to mega-constellation IDs M-D, M-E, and M-F is provided by a mega-constellation business operator 40d.

Furthermore, it is indicated in FIG. 14 that information related to a constellation ID C-A is provided by a constellation business operator 40e. It is indicated that information related to a constellation ID C-B is provided by a constellation business operator 40f. It is indicated that information related to a constellation ID C-C is provided by a constellation business operator 40g.

As indicated in FIG. 16, when it is foreseen that a space object A included in the plurality of space objects will intrude into a congested orbit or a polar high-latitude area, the space information recorder 100 records a time period from intrusion to exit and orbit forecast information.

The congested orbit is a range at orbital altitudes of 300 km to 1000 km in which a satellite group of LST 10:00 to 11:00 is present. Specifically, it is a case in which the space information recorder 100 issues the intrusion alert 504 of FIG. 16.

The polar/high-latitude area is a range at latitudes of 80 and more degrees north or latitudes of 80 and more degrees south and at orbital altitudes of 300 km to 1000 km that is congested with a polar orbit satellite group. Specifically, it is a case in which the space information recorder 100 issues the intrusion alert 505 of FIG. 16.

As illustrated in FIG. 13, the space information recorder 100 records, as orbit information, an upper limit value and a lower limit value of the orbital altitude of a constellation satellite group flying at the same nominal altitude and realizing a single mission that are acquired from a mega-constellation business device.

As illustrated in FIG. 13, the space information recorder 100 records, as orbit information, an upper limit value and a lower limit value of the orbital inclination of the constellation satellite group flying at the same nominal altitude and realizing a single mission that are acquired from the mega-constellation business device.

When it is foreseen that the space object A will intrude into an orbital altitude zone and a latitude zone in which a satellite group constituting a mega-constellation is present, the space information recorder 100 records a time period from intrusion to exit and orbit forecast information. Specifically, it is a case in which the space information recorder 100 issues the intrusion alert 503 of FIG. 16.

The space information recorder 100 includes issuance means (issuance unit 120) to issue the intrusion alert 111 when it is foreseen that another space object will intrude into an orbital altitude zone and a latitude zone in which a satellite group is present.

FIG. 17 is a detailed example of orbit record information 519 of the space object information 500 in the space information recorder 100 according to this embodiment. The orbit record information 519 is referred to also as a precise orbit record or high-precision orbit record information.

The space object information 500 includes the orbit record information 519 in addition to the orbit forecast information 51.

The orbit record information 519 includes a collision occurrence time estimated by post-accident verification after occurrence of a collision accident between a space object A and a space object B, location information of the space object A at or immediately before the time concerned, and location information of the space object B at or immediately before the time concerned.

When the space object A is a rocket and it is foreseen that the space object A while being launched will intrude into an orbital altitude zone and a latitude zone in which a satellite group is present, the space information recorder 100 records a time period from intrusion to exit and orbit forecast information.

When the space object A is a space object in a process of deorbiting and it is foreseen that the space object A in the process of deorbiting will intrude into an orbital altitude zone and a latitude zone in which a satellite group is present, the space information recorder 100 records a time period from intrusion to exit and orbit forecast information.

When the space object A is a space object in a process of orbital transfer and it is foreseen that the space object A in the process of orbital transfer will intrude into an orbital altitude zone and a latitude zone in which a satellite group is present, the space information recorder 100 records a time period from intrusion to exit and orbit forecast information.

The space information recorder 100 acquires, from a management business device used by a management business operator that manages a plurality of space objects flying in space, flight forecast information indicating a flight forecast for each of the plurality of space objects. The space information recorder 100 sets a forecast epoch of an orbit of each of the plurality of space objects, a forecast orbital element that identifies the orbit, and a forecast error that is forecast for the orbit, as orbit forecast information, based on the acquired flight forecast information. The space information recorder 100 contains the orbit forecast information that is set as described above. The space information recorder 100 registers orbit forecast information acquired from a mega-constellation business device not as information on individual satellites, and registers an orbital altitude and an orbital inclination of a satellite group as orbit information.

The space information recorder 100 includes issuance means (issuance unit 120) to issue an intrusion alert when it is foreseen that another space object will intrude into an orbital altitude zone and a latitude zone in which a satellite group constituting a mega-constellation is present. The latitude range in which the satellite group is present depends on the orbital inclination.

DESCRIPTION OF EFFECTS OF THIS EMBODIMENT

Generally, when a collision between space objects is foreseen, an SSA business operator issues a proximity alert or a collision alert, and the space station ISS or a satellite business operator takes an avoidance action as necessary. With the emergence of mega-constellations, it will be difficult for an external organization other than a mega-constellation business operator who has high-precision orbit information to carry out collision prediction analysis. Therefore, it is necessary to review the alert system as described above.

In this embodiment, attention is focused on specific orbital altitudes at which a mega-constellation business operator deploys satellites comprehensively in the sky. The system has been described in which when it is predicted that a satellite during orbital descent after deorbit or debris will pass through the altitudes concerned, an alert for intrusion into the altitudes concerned is issued.

In passage through a congested orbit in the vicinity of LST 10:30 and at an altitude of 500 to 800 km or a congested area such as a polar/high-latitude region, there are a large number of satellites with a high risk of collision. In addition, there is a high possibility that many business operators will be involved, and there is a concern that an avoidance action cannot be carried out. The vicinity of LST 10:30 is a sun-synchronous orbit often used by optical satellites for Earth observation. Polar orbit satellites frequently pass through the polar/high-latitude region.

Therefore, in this embodiment, the system has been described in which even when it is predicted that a satellite during orbital descent after deorbit or debris will pass through the congested orbit or the polar/high-latitude region, an alert for intrusion into the congested orbit is issued.

For an alert for intrusion into a mega-constellation, the mega-constellation business operator can take a collision avoidance action if required by carrying out collision analysis using high-precision orbit information held by the mega-constellation business operator itself.

For an alert for intrusion into the congested orbit or the polar/high-latitude region, a collision may be avoided by notifying the party concerned and also notifying a debris removal business operator so as to remove the intruding object as debris.

With regard to space insurance related to collision accidents, in the existing space insurance, a fortuitous accident or an accidental failure is covered by the insurance. However, a situation in which an intrusion alert is issued for passage through the orbital altitude used by a mega-constellation or through the congested orbit or the polar/high-latitude region cannot be considered as a fortuitous accident and can be regarded as a foreseeable collision accident.

Furthermore, if a collision accident occurs, there is a high risk that a chain-reaction collision with a satellite flying in the vicinity will cause further damage.

Therefore, to apply the existing insurance, the frequency of occurrence of accidents and the expected scale of damage are significantly different. Therefore, it is necessary to review insurance premium rates, disclaimers, contract conditions, and insurance premiums.

In particular, for a mega-constellation, it is rational to purchase insurance as a satellite group, instead of purchasing space insurance for individual satellites.

In order to distinguish between a fortuitous accident and a foreseeable collision accident, it is conceivable to newly establish ad-hoc space object collision insurance which can be purchased after issuance of a proximity alert or a collision alert and for which the contract is terminated after the foreseen risk is resolved. A space object intrusion alert system is a new concept for this, and it is rational to arrange that space collision insurance can be purchased after issuance of an intrusion alert, as in the case of a proximity alert or a collision alert.

As countermeasure actions for intrusion alerts, there are possibilities that avoidance actions are taken by an intruding party, a mega-constellation, a congested orbit, and a satellite passing through a polar region. In addition to these possibilities, a measure in which a debris removal business operator removes an intruding object so as to avoid a collision may be considered. Therefore, there are various options for countermeasure actions.

Furthermore, it is also necessary to evaluate a risk of taking an avoidance action itself, such as a risk of colliding with another space object as a result of taking the avoidance action. If it is judged that taking the avoidance action increases the risk, "to take no avoidance action for the intrusion alert" may be an option.

Difficult negotiations between the parties concerned are required, such as which one of the parties concerned is to take an avoidance action, or whether a debris removal business operator is to be employed and how to share those costs. Therefore, consulting or advice by a collision avoidance assistance expert is also effective.

In the space information recorder according to this embodiment, intrusion by space objects into a mega-constellation, a congested orbit, and a congested area such as a polar/high-latitude region can be accurately foreseen. In addition, information of space objects in collisions can be accumulated in detail.

Other Configurations

In this embodiment, the functions of the space information recorder 100 are realized by software. As a variation, the functions of the space information recorder 100 may be realized by hardware.

Figure 18:
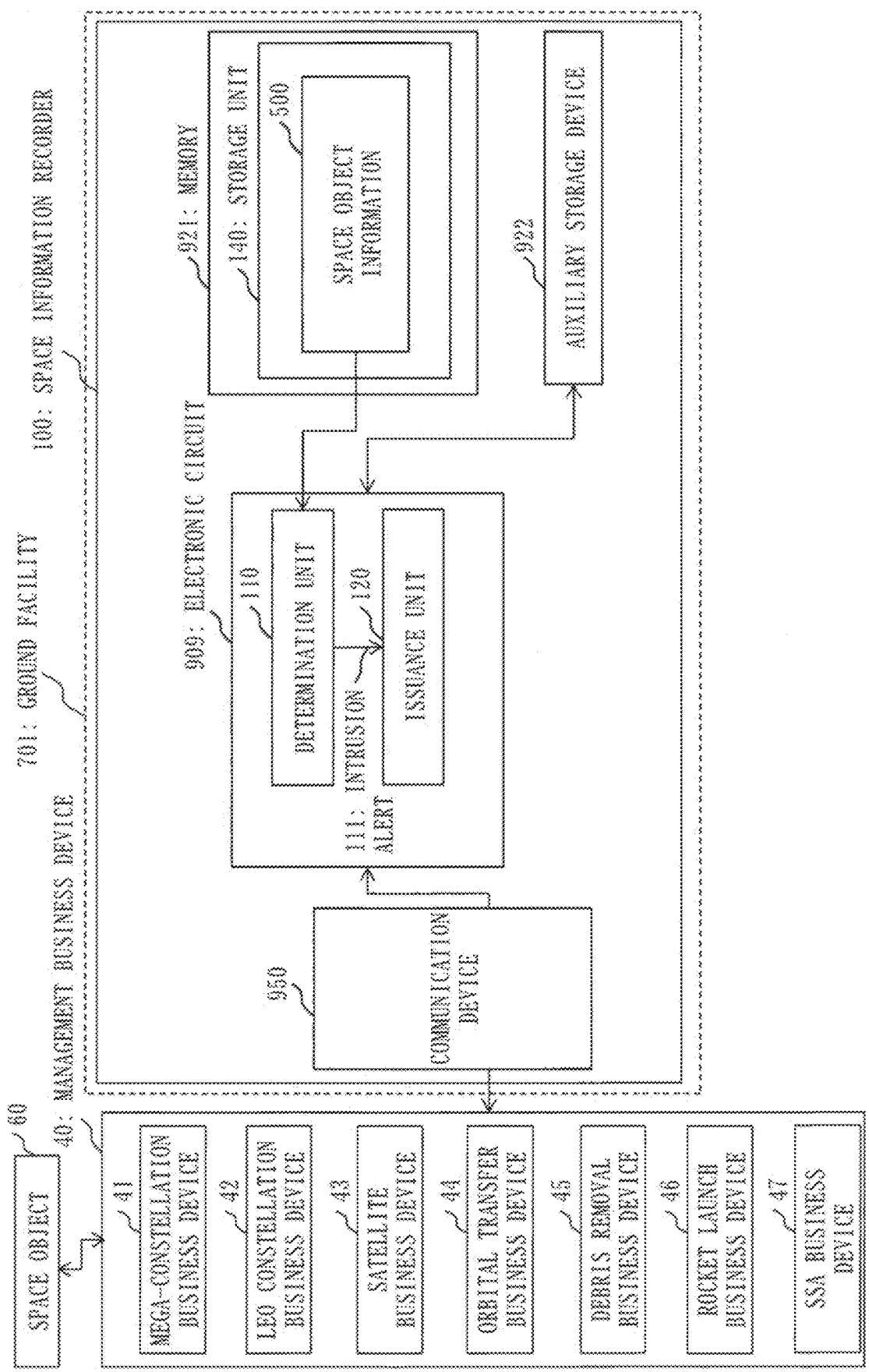
FIG. 18 is an example of a configuration of the space information recorder according to a variation of Embodiment 1.

FIG. 18 is a diagram illustrating a configuration of the space information recorder 100 according to a variation of this embodiment.

The space information recorder 100 includes an electronic circuit 909 in place of the processor 910.

The electronic circuit 909 is a dedicated electronic circuit that realizes the functions of the space information recorder 100.

Specifically, the electronic circuit 909 is a single circuit, a composite circuit, a programmed processor, a parallel-programmed processor, a logic IC, a GA, an ASIC, or an FPGA. GA is an abbreviation for Gate Array.

The functions of the space information recorder 100 may be realized by one electronic circuit, or may be distributed among and realized by a plurality of electronic circuits.

As another variation, some of the functions of the space information recorder 100 may be realized by the electronic circuit, and the rest of the functions may be realized by software.

Each of the processor and the electronic circuit is also called processing circuitry. That is, the functions of the space information recorder 100 are realized by the processing circuitry.

Embodiment 2

In this embodiment, differences from Embodiment 1 or additions to Embodiment 1 will be mainly described. In this embodiment, components that are substantially the same as those in Embodiment 1 will be denoted by the same reference signs and description thereof will be omitted.

Description of Configurations

Figure 19:
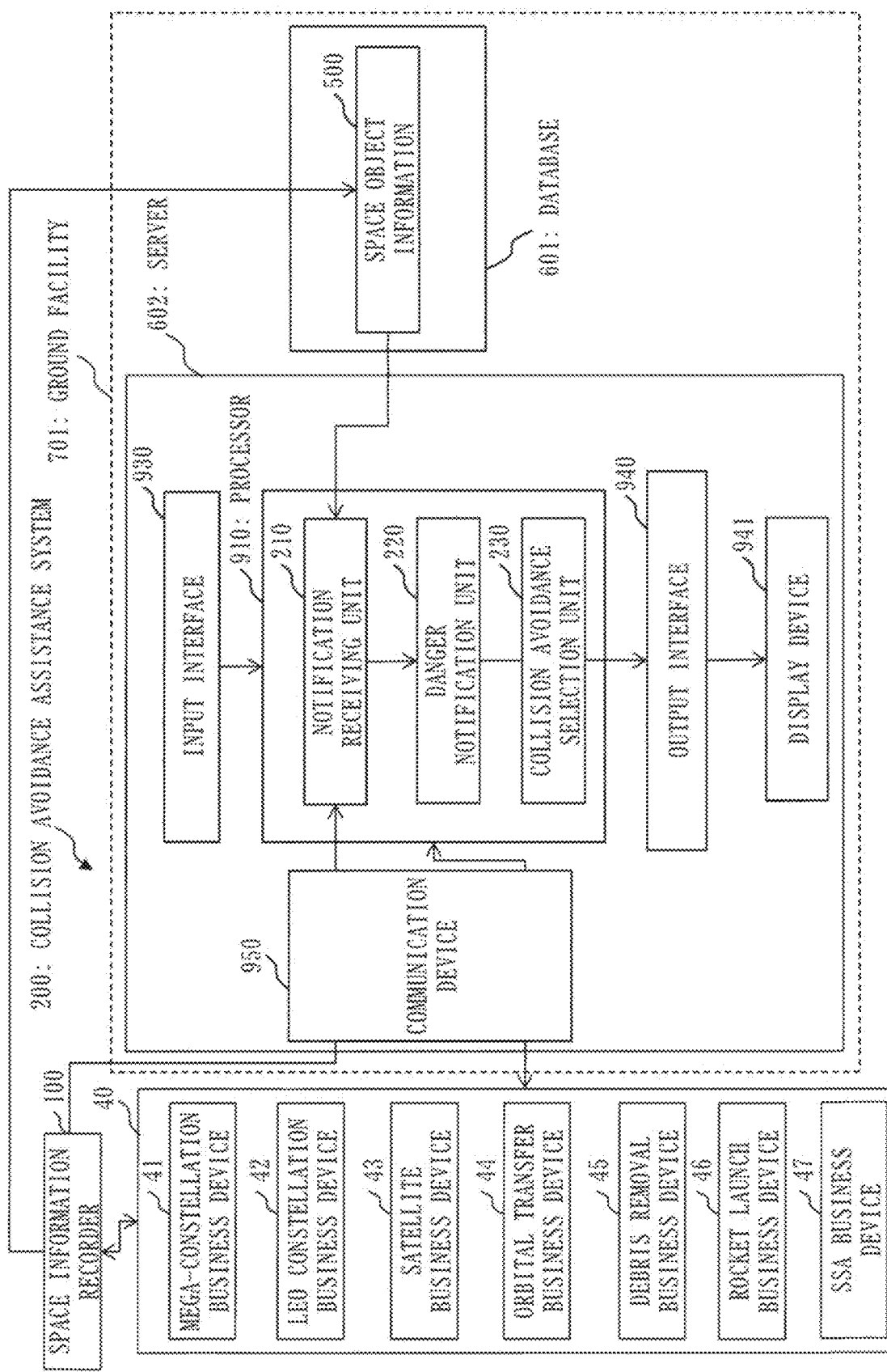
FIG. 19 is an example of a configuration of a collision avoidance assistance system according to Embodiment 2.

FIG. 19 is a diagram illustrating an example of a configuration of a collision avoidance assistance system 200 according to this embodiment.

The collision avoidance assistance system 200 acquires the space object information 500 from the space information recorder 100, and assists avoidance of a collision between space objects. The space information recorder 100 records the space object information 500 acquired from the management business device 40 used by a management business operator that manages a plurality of space objects.

The collision avoidance assistance system 200 includes a database 601 and a server 602. The database 601 stores the space object information 500 acquired from the space information recorder 100. The server 602 includes decision means to decide a collision avoidance business operator. The database 601 and the server 602 are included in a ground facility 701. The ground facility 701 is referred to also as a collision avoidance assistance device.

The server 602 includes, as functional elements, a notification receiving unit 210, a danger notification unit 220, and a collision avoidance selection unit 230.

The notification receiving unit 210 has a phase of receiving a notification about foreseen intrusion from the space information recorder 100 when it is foreseen that a space object A included in the plurality of space objects will intrude into a range of a danger area.

The notification receiving unit 210 has a phase of acquiring a time period from intrusion into and exit from the danger area by the space object A and orbit forecast information from the space information recorder 100.

The danger notification unit 220 has a phase of notifying a danger alert for the time period concerned to all or at least one of a business operator of the space object A, a satellite business operator that owns a satellite flying in the range of the danger area, and a debris removal business operator.

The collision avoidance selection unit 230 has a phase of selecting a candidate for the collision avoidance business operator and a phase of requesting the collision avoidance business operator to take a collision avoidance action. The collision avoidance selection unit 230 is an example of the decision means.

In the following embodiments, a phrase that a "unit" has a "phase" can be replaced with a phrase that "a unit has a function", "a unit realizes a function", or "a unit executes a process".

Specifically, this is as described below.

The notification receiving unit 210 has a function of receiving a notification about foreseen intrusion from the space information recorder 100 when it is foreseen that a space object A included in the plurality of space objects will intrude into a range of a danger area.

The notification receiving unit 210 has a function of acquiring a time period from intrusion into and exit from the danger area by the space object A and orbit forecast information from the space information recorder 100.

The danger notification unit 220 has a function of notifying a danger alert for the time period concerned to all or at least one of a business operator of the space object A, a satellite business operator that owns a satellite flying in the range of the danger area, and a debris removal business operator.

The collision avoidance selection unit 230 has a function of selecting a candidate for the collision avoidance business operator and a function of requesting the collision avoidance business operator to take a collision avoidance action.

Specific examples of the range of the danger area are as described below.

For example, when it is foreseen that the space object A will intrude into a range at orbital altitudes of 300 km to 1000 km in which a satellite group of LST 10:00 to 11:00 is present, the notification receiving unit 210 receives an intrusion notification from the space information recorder 100.

For example, when it is foreseen that the space object A will intrude into a range at latitudes of 80 and more degrees north or latitudes of 80 and more degrees south and at altitudes of 300 km to 1000 km that is congested with a polar orbit satellite group, the notification receiving unit 210 receives an intrusion notification from the space information recorder 100.

For example, when it is foreseen that the space object A will intrude into a range of an orbital altitude zone and a latitude zone in which a satellite group constituting a mega-constellation composed of 100 or more satellites is present, the notification receiving unit 210 receives an intrusion notification from the space information recorder 100.

The collision avoidance selection unit 230, which is the decision means, selects a management business operator of the space object A that has a collision avoidance function.

The server 602 has a phase of requesting the management business operator of the space object A to take an intrusion avoidance action to change a time period or an orbit in which intrusion is to be made by the space object A. Specifically, the collision avoidance selection unit 230 requests the management business operator of the space object A to take an intrusion avoidance action to change a time period or an orbit in which intrusion is to be made by the space object A.

The collision avoidance selection unit 230, which is the decision means, selects a debris removal business operator.

The server 602 has a phase of requesting the debris removal business operator to take an intrusion avoidance action to capture the space object A and change a time period or an orbit in which intrusion into the range is to be made. Specifically, the collision avoidance selection unit 230 requests the debris removal business operator to take an intrusion avoidance action to capture the space object A and change a time period or an orbit in which intrusion into the range of the danger area is to be made.

The collision avoidance selection unit 230, which is the decision means, selects a mega-constellation business operator.

The server 602 has a phase of requesting the mega-constellation business operator to take an action to avoid a collision between a satellite group constituting a mega-constellation and the space object A. Specifically, the collision avoidance selection unit 230 requests the mega-constellation business operator to take an action to avoid a collision between a satellite group constituting a mega-constellation and the space object A.

The collision avoidance assistance system 200 has a collision avoidance assistance program that causes a computer to execute the following processes.

A process of, before occurrence of a collision between space objects among a plurality of space objects flying in space, identifying existence of danger-anticipated objects based on orbit forecast information of the space objects, outputting a danger alert, and deciding a space object to perform an avoidance operation.

A process of acquiring, from a management business device used by a management business operator that manages a plurality of space objects flying in space, flight forecast information indicating a flight forecast for each of the plurality of space objects.

A process of setting a forecast epoch of an orbit of each of the plurality of space objects, a forecast orbital element that identifies the orbit, and a forecast error that is forecast for the orbit, as orbit forecast information, based on the acquired flight forecast information.

A danger alert output process of outputting a danger alert indicating existence of danger-anticipated objects when it is foreseen that another space object will intrude into an orbital altitude zone and a latitude zone in which a satellite group constituting a mega-constellation is present.

The collision avoidance assistance system 200 has a collision avoidance assistance program that causes a computer to execute the following processes.

A process of, before occurrence of a collision between space objects among a plurality of space objects flying in space, identifying existence of danger-anticipated objects based on orbit forecast information of the space objects, outputting a danger alert, and deciding a space object to perform an avoidance operation.

A process of acquiring, from a management business device used by a management business operator that manages a plurality of space objects flying in space, flight forecast information indicating a flight forecast for each of the plurality of space objects.

A process of setting a forecast epoch of an orbit of each of the plurality of space objects, a forecast orbital element that identifies the orbit, and a forecast error that is forecast for the orbit, as orbit forecast information, based on the acquired flight forecast information.

An avoidance space object decision process of deciding a space object to perform an avoidance operation among space objects included in the danger-anticipated objects when it is foreseen that another space object will intrude into an orbital altitude zone and a latitude zone in which a satellite group constituting a mega-constellation is present, based on orbit forecast information.

Figure 20:
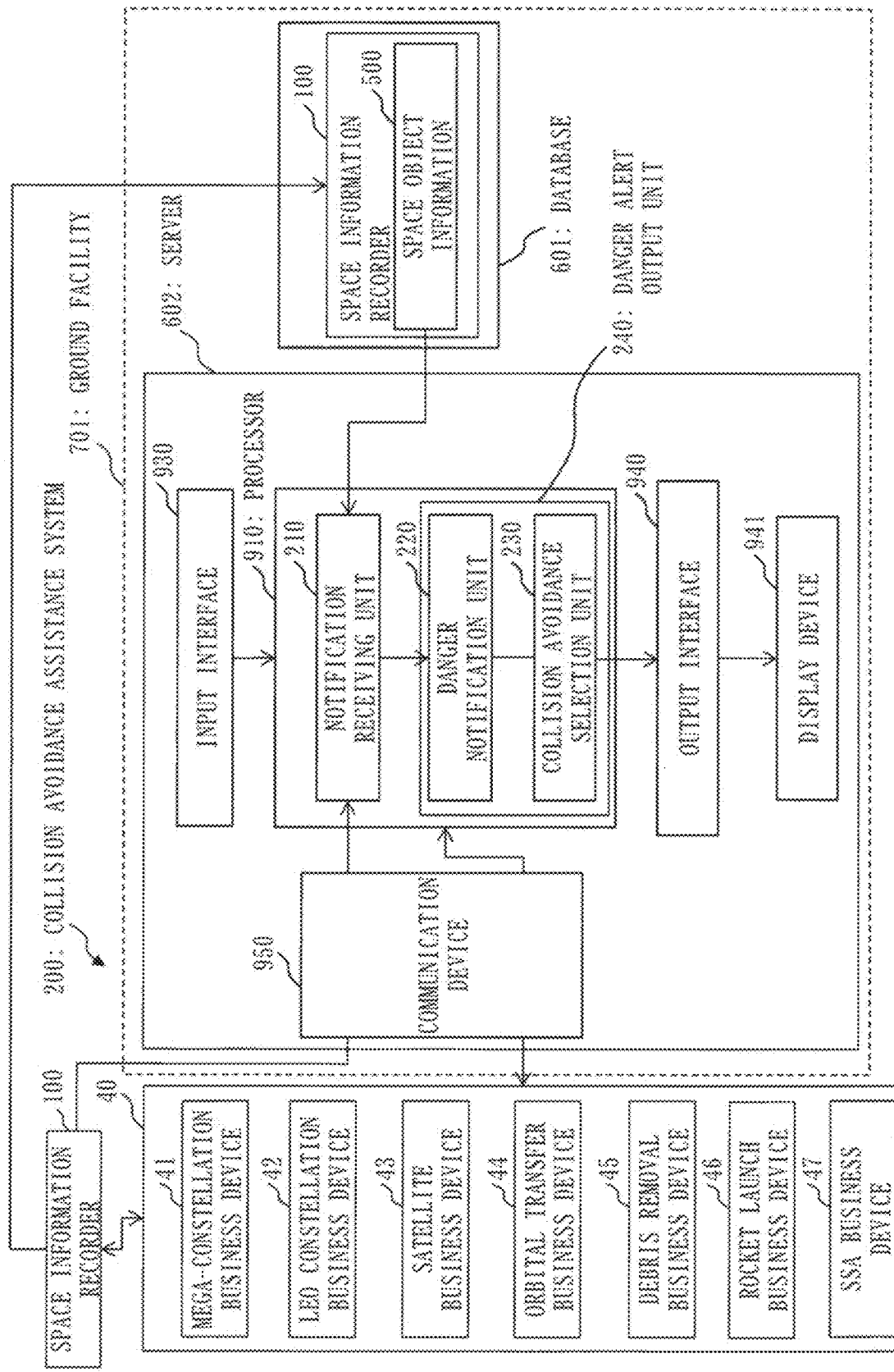
FIG. 20 is another example of the configuration of the collision avoidance assistance system according to Embodiment 2.

FIG. 20 is a diagram illustrating another example of the configuration of the collision avoidance assistance system 200 according to this embodiment.

As illustrated in FIG. 20, the ground facility 701 (collision avoidance assistance device) may include the space information recorder 100.

The server 602 incudes a danger alert output unit 240 to, before occurrence of a collision between space objects among a plurality of space objects flying in space, identify existence of danger-anticipated objects based on orbit forecast information of the space objects, output a danger alert, and decide a space object to perform an avoidance operation. The danger notification unit 220 and the collision avoidance selection unit 230 are examples of the danger alert output unit 240.

The space information recorder 100 acquires flight forecast information indicating a flight forecast for each of the plurality of space objects from the management business device 40. Then, the space information recorder 100 sets a forecast epoch of an orbit of each of the plurality of space objects, a forecast orbital element that identifies the orbit, and a forecast error that is forecast for the orbit, as orbit forecast information, based on the acquired flight forecast information.

DESCRIPTION OF EFFECTS OF THIS EMBODIMENT

The collision avoidance assistance system according to this embodiment can accurately foresee intrusion of a space object into a congested area, and can also select a collision avoidance business operator and request a collision avoidance action.

Embodiment 3

In this embodiment, differences from Embodiments 1 and 2 or additions to Embodiments 1 and 2 will be mainly described. In this embodiment, components that are substantially the same as those in Embodiments 1 and 2 will be denoted by the same reference signs and description thereof will be omitted.

Description of Configurations

In this embodiment, examples of the management business device 40 that includes the space information recorder 100 will be described. In particular, examples of the mega-constellation business device 41 that includes the space information recorder 100 will be described. In addition, information management methods by the mega-constellation business device 41 that includes the space information recorder 100 will be described.

Figure 21:
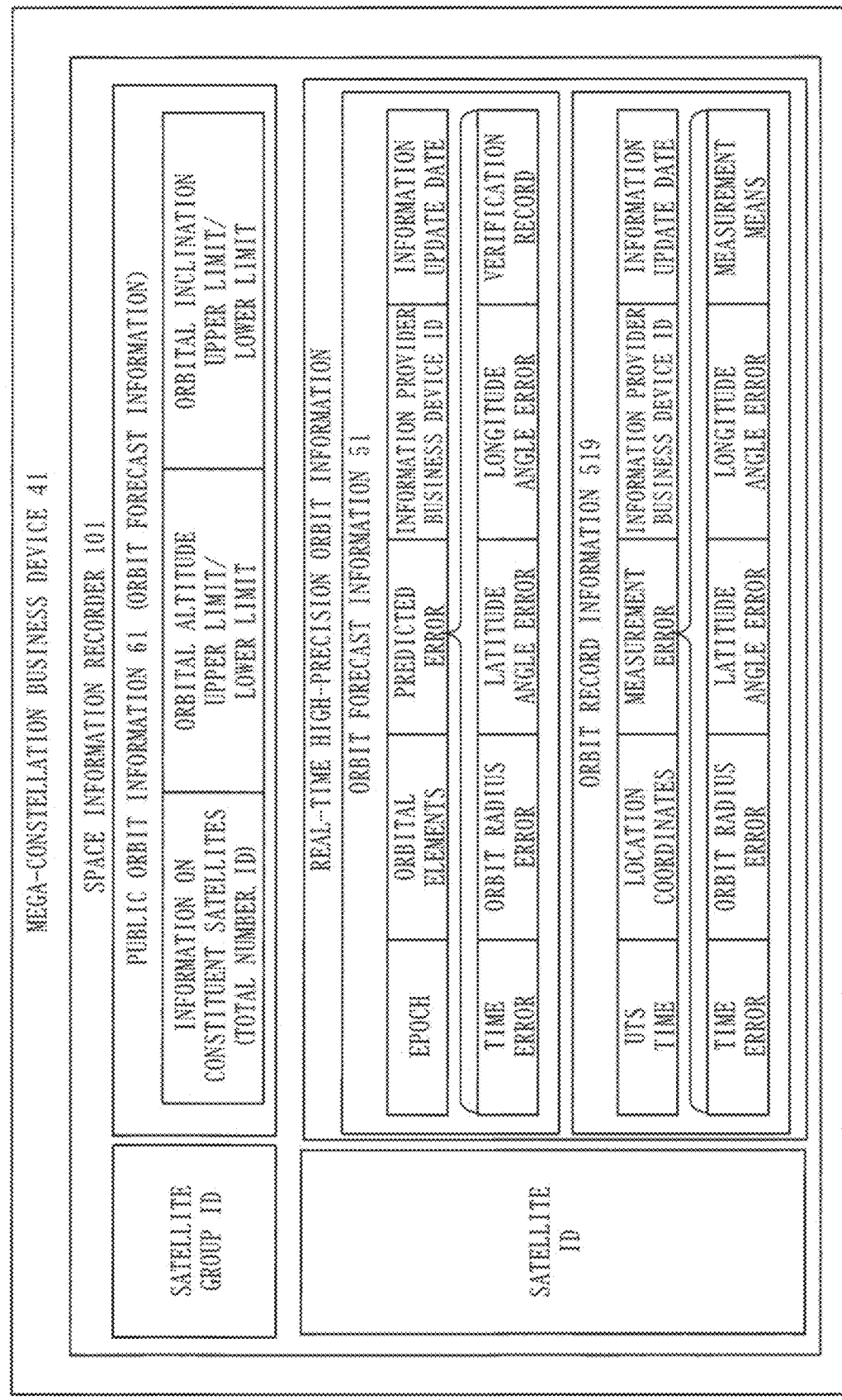
FIG. 21 is an example of a configuration of a space information recorder included in a mega-constellation business device according to Embodiment 3.

FIG. 21 is a diagram illustrating an example of a configuration of the space information recorder 100 included in the mega-constellation business device 41 according to this embodiment.

For example, the mega-constellation business device 41 and the SSA business device 47 share the space information recorder 100.

The space information recorder 100 acquires, from the management business device 40 that manages a plurality of space objects flying in space, orbit forecast information of the plurality of space objects and records the orbit forecast information.

The SSA business device 47 includes the space information recorder 100.

The mega-constellation business device 41 provides orbit forecast information to the SSA business device 47.

In this embodiment, information management methods of the mega-constellation business device 41 that provides orbit forecast information to the space information recorder 100 included in the SSA business device 47 will be described.

The space information recorder 100 of the mega-constellation business device 41 has, as orbit forecast information, an upper limit value and a lower limit value of an orbital altitude of a satellite group flying at the same nominal altitude and cooperatively realizing a single mission among a satellite group constituting a mega-constellation. The mega-constellation business device 41 provides this orbit forecast information (public orbit information 61) to the SSA business device 47.

The space information recorder 100 of the mega-constellation business device 41 has, as orbit forecast information, an upper limit value and a lower limit value of an orbital inclination of a satellite group flying at the same nominal altitude and cooperatively realizing a single mission among a satellite group constituting a mega-constellation. The mega-constellation business device 41 provides this orbit forecast information (public orbit information 61) to the SSA business device 47.

When it is foreseen that a space object A will intrude into an orbital altitude zone and a latitude zone in which a mega-constellation satellite group is present, the space information recorder 100 of the mega-constellation business device 41 acquires an intrusion alert from the SSA business device 47. The space object A is a space object included in the space information recorder 100 included in the SSA business device 47. The mega-constellation satellite group is a satellite group constituting a mega-constellation.

When it is foreseen that the space object A will intrude into an orbital altitude zone and a latitude zone in which a mega-constellation satellite group is present, the space information recorder 100 of the mega-constellation business device 41 acquires a time period from intrusion and exit of the space object A and orbit forecast information from the SSA business device 47. The space information recorder 100 of the mega-constellation business device 41 acquires the time period from intrusion and exit of the space object A and the orbit forecast information of the space object A from the space information recorder 100 of the SSA business device 47.

When it is foreseen that a space object A will intrude into an orbital altitude zone and a latitude zone in which a mega-constellation satellite group is present, the space information recorder 100 of the mega-constellation business device 41 carries out collision analysis using high-precision orbit forecast information of the satellite group held by itself and orbit forecast information of the space object A. The space information recorder 100 of the mega-constellation business device 41 carries out collision analysis using high-precision orbit forecast information of the satellite group held by a mega-constellation business operator and orbit forecast information of the space object A.

When it is foreseen that a space object A will intrude into an orbital altitude zone and a latitude zone in which a mega-constellation satellite group is present and when a collision is foreseen as a result of the collision analysis, the space information recorder 100 of the mega-constellation business device 41 provides a collision alert, orbit forecast information of a satellite for which the collision is foreseen, and a collision forecast time to the SSA business device 47.

When it is foreseen that a space object A will collide with a satellite belonging to a mega-constellation, the space information recorder 100 of the mega-constellation business device 41 uses orbit forecast information of the space object A. The space information recorder 100 of the mega-constellation business device 41 uses the orbit forecast information of the space object A as a control index in a collision avoidance action by the mega-constellation business device.

In an information management method of the mega-constellation business device 41, the following procedure is carried out when it is foreseen that a space object A included in the space information recorder 100 included in the SSA business device 47 will intrude into an orbital altitude zone and a latitude zone in which a mega-constellation satellite group is present.

The mega-constellation business device 41 carries out collision analysis using high-precision orbit forecast information of a satellite group held by the mega-constellation business device 41 and orbit forecast information of the space object A.

When a collision is foreseen, the mega-constellation business device 41 provides a collision alert, orbit information of a satellite for which the collision is foreseen, and a collision forecast time to a management business device of the space object A and a management business device of a space insurance business operator.

In an information management method of the mega-constellation business device 41, the following procedure is carried out.

The mega-constellation business device 41 acquires, from a management business device used by a management business operator that manages a plurality of space objects flying in space, flight forecast information indicating a flight forecast for each of the plurality of space objects.

The mega-constellation business device 41 sets a forecast epoch of an orbit of each of the plurality of space objects, a forecast orbital element that identifies the orbit, and a forecast error that is forecast for the orbit, as orbit forecast information, based on the acquired flight forecast information. The mega-constellation business device 41 outputs information on an orbital altitude and an orbital inclination of a mega-constellation satellite group to the space information recorder 100 that contains these pieces of orbit forecast information.

In an information management method of the mega-constellation business device 41, the following procedure is carried out.

Danger alert acquisition means acquires a danger alert indicating existence of an intrusion-anticipated object when it is foreseen that another space object will intrude, as the intrusion-anticipated object, into an orbital altitude zone and a latitude zone in which a mega-constellation satellite group is present, based on orbit forecast information included in the space information recorder 100.

In an information management method of the debris removal business device 45, the following procedure is carried out.

Danger alert acquisition means acquires a danger alert indicating existence of an intrusion-anticipated object when it is foreseen that another space object will intrude, as the intrusion-anticipated object, into an orbital altitude zone and a latitude zone in which a mega-constellation satellite group is present, based on orbit forecast information included in the space information recorder 100.

DESCRIPTION OF EFFECTS OF THIS EMBODIMENT

In the information management methods of a mega-constellation business device according to this embodiment, an SSA business device can appropriately foresee intrusion into the orbit area of a mega-constellation satellite group by a space object A, using orbit forecast information of the mega-constellation satellite group.

Then, the mega-constellation business device can appropriately take an avoidance action based on the orbit forecast information of the space object A acquired from the SSA business device.

Embodiment 4

In this embodiment, differences from Embodiments 1 to 3 or additions to Embodiments 1 to 3 will be mainly described. In this embodiment, components that are substantially the same as those in Embodiments 1 to 3 will be denoted by the same reference signs and description thereof will be omitted.

Figure 22:
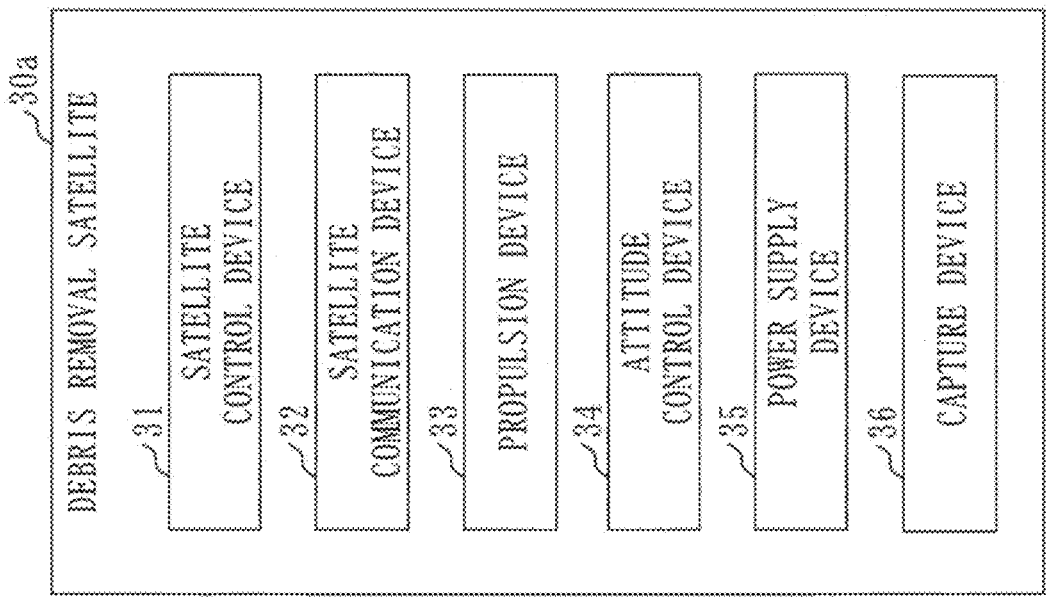
FIG. 22 is an example of a configuration of a debris removal satellite according to Embodiment 4.

Description of Configurations FIG. 22 is a diagram illustrating an example of a configuration of a debris removal satellite 30a according to this embodiment.

Figure 23:
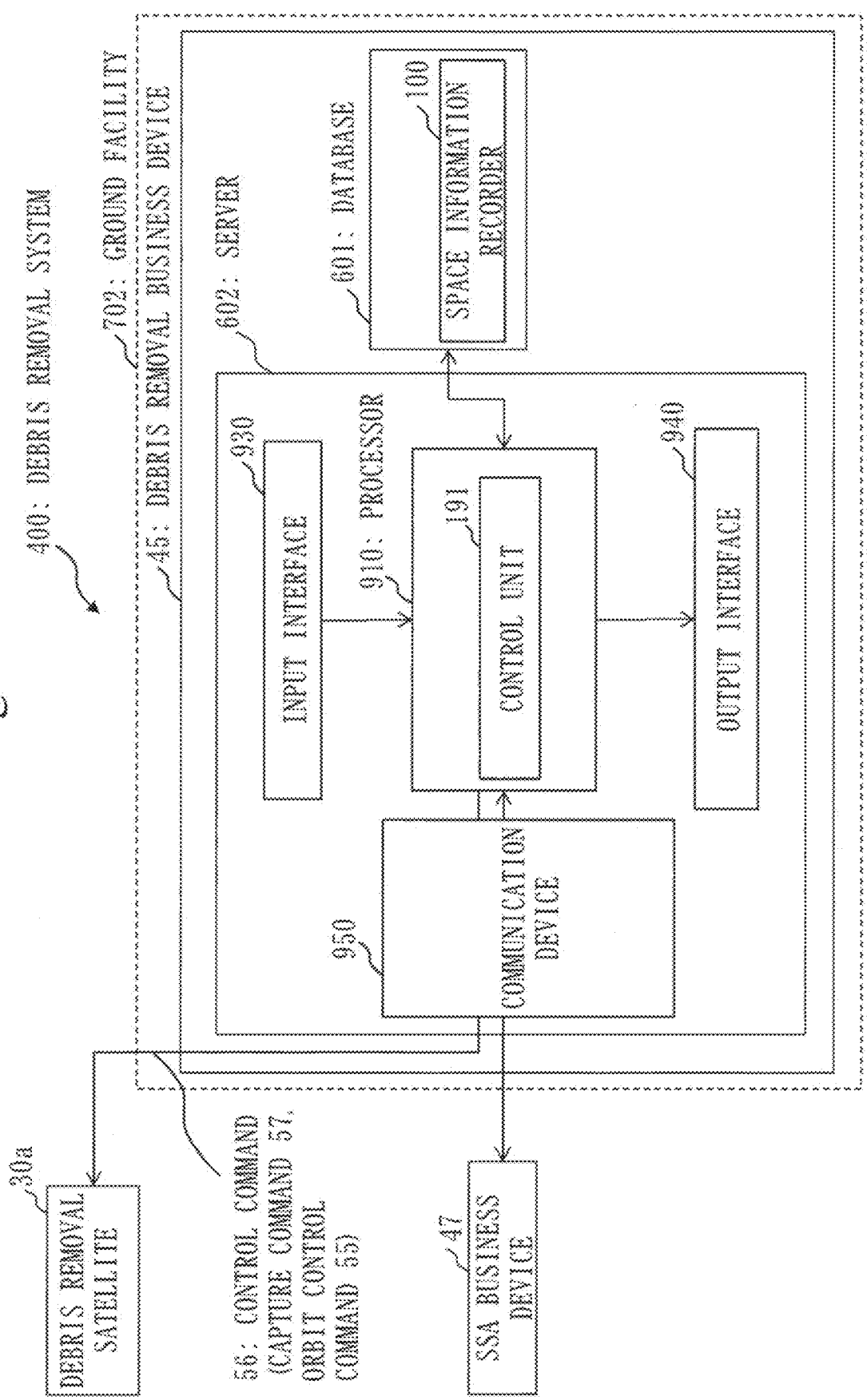
FIG. 23 is an example of a configuration of a debris removal system according to Embodiment 4.

FIG. 23 is a diagram illustrating an example of a configuration of a debris removal system 400 according to this embodiment.

In this embodiment, the debris removal system 400 composed of the debris removal satellite 30a, including a capture device 36 to capture a space object and the propulsion device 33, and a ground facility 702, including means for controlling the debris removal satellite 30a, will be described. The ground facility 702 is referred to also as a ground system 72. In FIG. 23, a control unit 191 is an example of the means for controlling the debris removal satellite 30a.

The ground facility 702 includes the space information recorder 100 to record space object information acquired from the management business device 40 that manages a plurality of space objects and includes the server 602. The space information recorder 100 may be stored in the database 601.

Figure 24:
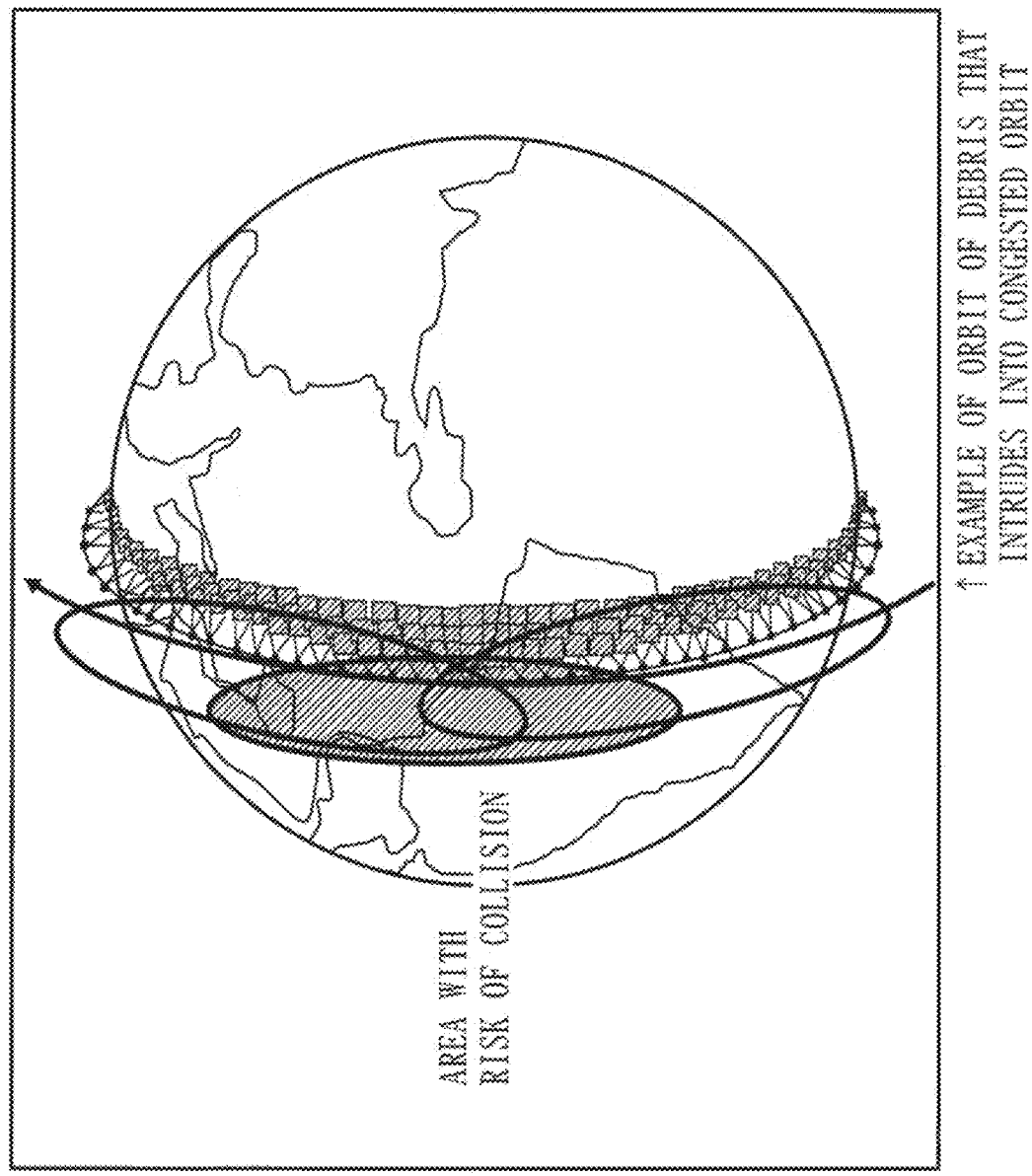
FIG. 24 is an example of an orbit of debris that intrudes into a satellite orbit area according to Embodiment 4.

FIG. 24 is a diagram illustrating an example of an orbit of debris that intrudes into the satellite orbit area 301 according to this embodiment.

Even in the present situation, satellites of a large number of business operators of multiple counties are flying in the vicinity of sun-synchronous orbit LST 10:30 and at orbital altitudes of about 500 km to 800 km often used by Earth observation optical satellites. It is expected that in the future it will become a congested orbit where satellites of a large number of stakeholders operate as a string of closely located satellites. If debris intrudes into approximately the same plane as this congested orbital plane, a large number of satellites will become subjects of a proximity alert or a collision alert.

Furthermore, in this orbit, a satellite without means for autonomously taking an avoidance action, such as a small satellite called a CubeSat, cannot take an avoidance action even if a collision alert is issued. If there are both satellites that take an avoidance action and satellites that do not taken an avoidance action in the congested orbit, a secondary risk of collision such as a collision with a different satellite as a result of avoidance will arise. Thus, it is not always rational to take an avoidance action in the congested orbit.

If the predicted time of arrival of debris includes an error, it will translate into a large distance if the flight direction of satellites and the flight direction of the debris are close, so that a large number of satellites will be exposed to a risk of collision.

Since it takes approximately 90 minutes to 100 minutes for a low Earth orbit satellite to complete one orbit, if there is uncertainty of about plus or minus 50 minutes in the arrival of debris, there will be a risk of collision for all satellites in the orbital plane concerned.

Furthermore, if a collision accident occurs in the congested orbit, another problem is that it is highly likely that a chain-reaction collision will occur.

Therefore, if prediction of an orbit of debris that will intrude into a congested orbit is found, it is rational to immediately issue an alert to a debris removal business operator so as to remove the debris.

The debris removal satellite 30a includes the capture device 36 to capture debris in addition to the components of the satellite 30 described with reference to FIGS. 5 to 8. Based on a control command 56 from the debris removal business device 45, the debris removal satellite 30a captures debris, and in a deorbit process until atmospheric entry, performs an active control operation during orbital descent so as to descend by avoiding areas with a high risk of collision with space objects. The active control operation during orbital descent is referred to also as an active deorbit operation.

The debris removal business device 45 may be installed in the ground facility 702. Alternatively, the debris removal business device 45 may be installed in another device that communicates with the debris removal business device 45.

The control unit 191 of the debris removal business device 45 generates the control command 56 to be transmitted to the debris removal satellite 30a. The control command 56 includes a capture command 57 and an orbit control command 55.

The control unit 191 generates the capture command 57 to capture debris with the capture device 36. The control unit 191 generates the orbit control command 55 to perform the active deorbit operation for the debris removal satellite 30a in a state after capturing the debris.

The debris removal satellite 30a captures the debris and performs the active deorbit operation, based on the control command 56.

The satellite orbit area 301 may include a high-latitude area including a polar region. The alert notification unit 130 notifies the intrusion alert 111 for alerting that debris will intrude into the high-latitude area including the polar region to the debris removal business device 45 used by the debris removal business operator that removes debris.

Figure 25:
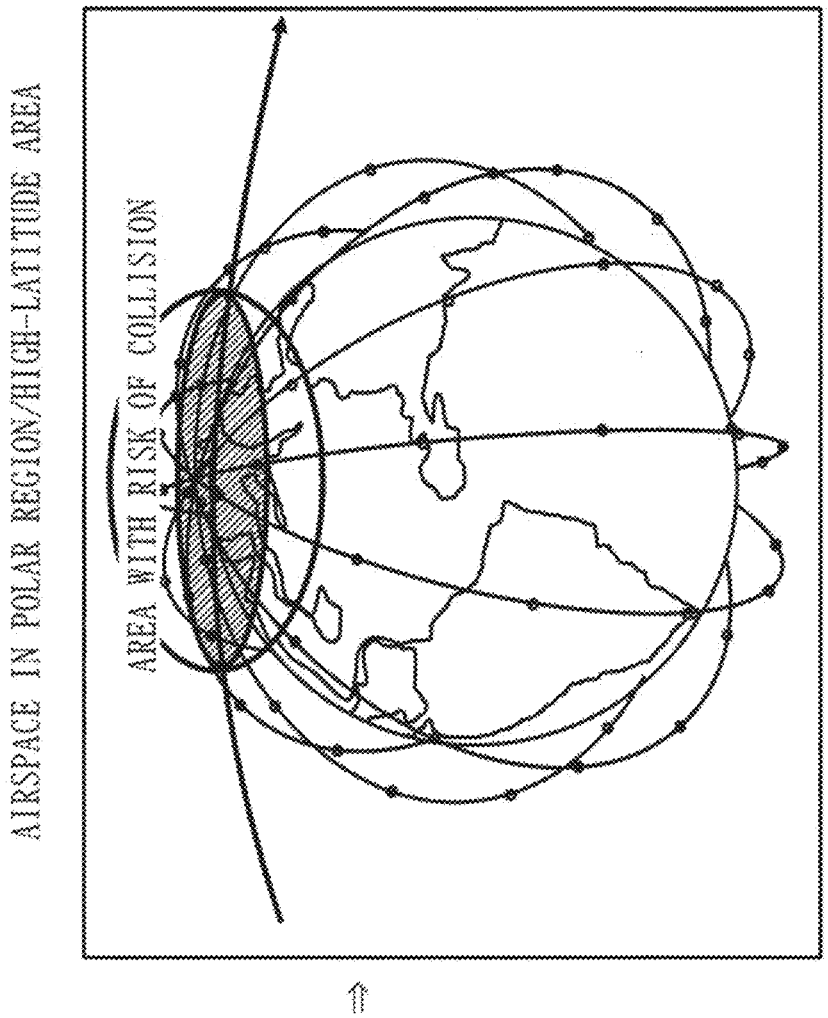
FIG. 25 is an example of an orbit of debris that intrudes into the satellite orbit area according to Embodiment 4.

FIG. 25 is a diagram illustrating an example of an orbit of debris that intrudes into the satellite orbit area 301 according to this embodiment.

In a constellation of polar orbit satellites, all orbital planes pass through the polar regions, so that the polar regions become congested areas.

If the debris arrival time has a prediction error of plus or minus 50 minutes, a risk of collision may arise for all the satellites in all the orbital planes. Even if it is desirable to take an avoidance action, the avoidance action that a propulsion device included in a satellite can contribute to is typically no more than changing the orbital altitude, which may not be an effective risk avoidance measure, so that a situation may arise where it may be virtually difficult to take an avoidance action.

Therefore, if prediction of an orbit of debris that will intrude into airspace of a high-latitude area including a polar region is found, it is rational to immediately issue an alert to the debris removal business operator so as to remove the debris.

Specifically, the server 602 is the debris removal business device in this embodiment. The database 601 may be provided in the server 602 or may be a device separate from the server 602. The server 602 realizes the following phases with processing circuitry such as the processor 910 or an electronic circuit. Each of the following phases can be interrupted as a functional element, a unit, or means.

Specifically, the database 601 may be the memory 921, the auxiliary storage device 922, or a file server.

A functional configuration of the debris removal system 400 will be described below.

When it is forecast that a space object A included in a plurality of space objects will intrude into a range at orbital altitudes of 300 km to 1000 km in which a satellite group of LST 10:00 to 11:00 is present, the server 602 acquires an intrusion alert from the SSA business device 47.

The server 602 records a forecast time at which the space object A will intrude into the range and orbit forecast information in the space information recorder 100.

The server 602 controls the debris removal satellite 30a so as to approach the space object A before the forecast time.

The server 602 controls the debris removal satellite 30a so as to capture the space object A.

The server 602 causes the debris removal satellite 30a to operate the propulsion device 33 so as to control both or one of the orbital altitude and the orbital inclination and cause the space object A to enter the atmosphere without passing through the range.

When it is foreseen that a space object A included in a plurality of space objects will intrude into a range at latitudes of 80 and more degrees north or latitudes of 80 and more degrees south and at orbital altitudes of 300 km to 1000 km that is congested with a polar orbit satellite group, the server 602 acquires an intrusion alert from an SSA business operator.

The server 602 records a forecast time at which the space object A will intrude into the range and orbit forecast information in the space information recorder 100.

The server 602 controls the debris removal satellite 30a so as to approach the space object A before the forecast time.

The server 602 controls the debris removal satellite 30a so as to capture the space object A.

The server 602 causes the debris removal satellite 30a to operate the propulsion device 33 so as to change the orbital inclination and cause the space object A to enter the atmosphere without passing through the range.

Before a collision occurs between space objects among a plurality of space objects flying in space, the debris removal business device 45 captures one of the space objects and changes the orbit so as to avoid the collision. A debris removal program of the debris removal business device 45 causes a computer to execute a process of acquiring an intrusion alert when it is foreseen that another space object will intrude into an orbital altitude zone and a latitude zone in which a mega-constellation satellite group is present.

A debris removal program of the debris removal business device 45 causes a computer to execute a process of acquiring an intrusion alert when it is foreseen that another space object will intrude into an orbital plane or an area congested with satellites.

The space object information includes a forecast epoch, a forecast orbital element, and a forecast error of a space object.

The congested area is approximately a range at orbital altitudes of 300 km to 1000 km in which a satellite group of sun-synchronous orbit LST 10:00 to 11:00 is present.

The congested area is approximately a range at latitudes of 80 and more degrees north or latitudes of 80 and more degrees south and at orbital altitudes of 300 km to 1000 km in which a polar orbit satellite group flies.

The congested area includes an altitude range and a latitude range, acquired from a management business device of a satellite group constituting a mega-constellation, in which a constellation satellite group flying at the same nominal altitude and cooperatively realizing a single mission flies.

The server includes a phase of analyzing a forecast time period from intrusion into and exit from the congested area by the space object A and orbit forecast information.

The server includes a phase of transmitting a forecast time period from intrusion into and exit from the congested area by the space object A and orbit forecast information to a management business device of the space object A and a management business device of a space object that flies in the congested area.

The server includes a phase of transmitting an intrusion alert forecasting that the space object A will intrude into the congested area and a forecast time period from intrusion into and exit from the congested area by the space object A and orbit forecast information to a management business device of a debris removal business operator that manages a debris removal satellite.

The server includes a phase of transmitting an intrusion alert forecasting that the space object A will intrude into the congested area, a forecast time period from intrusion into and exit from the congested area by the space object A, and orbit forecast information to a management business device of a space insurance business operator that operates space insurance.

The management business device of the mega-constellation business operator includes means for performing collision analysis based on space object information of a satellite group of a mega-constellation and space object information of the space object A.

The server includes a phase of, when a collision is foreseen by the collision analysis, transmitting an intrusion alert to the management business device of the mega-constellation business operator in a collision avoidance method in which a satellite in a mega-constellation avoids a collision.

The management business device of the debris removal business operator that has debris removal means performs a collision avoidance method of capturing the space object A with the debris removal means at a forecast orbit location before an intrusion forecast time so as to avoid intrusion, based on the space object information of the space object A. In the collision avoidance method, the server transmits an intrusion alert to the management business device of the debris removal business operator.

The space insurance business operator operates an insurance payment system in which damage caused by a collision between space objects is compensated with an insurance payment, using an insurance premium collected and saved in advance as a financial resource. The insurance payment system is a system in which a contract is started after a collision between space objects is foreseen. In the insurance payment system, the server transmits an intrusion alert to the management business device of the space insurance business operator.

The space object A is a rocket to be newly launched. Alternatively, the space object A is a geostationary satellite during orbital transfer or a quasi-zenith satellite. Alternatively, the space object A is a space object during orbital descent in a deorbit process.

In Embodiments 1 to 4 above, the following business devices have been described.

An SSA business device includes a space information recorder to acquire, from a management business device that manages a plurality of space objects flying in space, orbit forecast information of the plurality of space objects, and record the orbit forecast information.

When it is foreseen that a space object A will intrude into a range congested with a satellite group, the SSA business device notifies a danger alert to one or more business operators (business devices used by the business operators) described below. Specifically, the SSA business device notifies a danger alert to all or at least one of a business operator of the space object A, a business operator that owns a satellite flying in the range, a mega-constellation satellite business operator, a debris removal business operator, and a space insurance business operator. The SSA business device requests a collision avoidance business operator to take a collision avoidance action.

The space information recorder included in the SSA business device is the space information recorder described in the embodiments above.

The SSA business device includes the space information recorder that executes the functions of the collision avoidance assistance system or the collision avoidance assistance program described in the embodiments above.

The SSA business device includes the space information recorder that executes the information management method described in the embodiments above.

A collision avoidance assistance business device is used by a business operator that assists avoidance of a collision between space objects.

When it is foreseen that a space object A will intrude into a range congested with a satellite group, the collision avoidance assistance business device notifies a danger alert to one or more business operators (business devices used by the business operators) described below, and requests a collision avoidance business operator to take a collision avoidance action. Specifically, the collision avoidance assistance business device notifies a danger alert to all or at least one of a business operator of the space object A, a business operator that owns a satellite flying in the range, a mega-constellation satellite business operator, and a debris removal business operator, and requests a collision avoidance business operator to take a collision avoidance action.

A mega-constellation business device is a business device used by a mega-constellation business operator that manages a mega-constellation satellite group composed of 100 or more satellites.

When it is foreseen that a space object A will intrude into a range congested with the mega-constellation satellite group, the mega-constellation business device acquires a danger alert and a collision avoidance action request from a collision avoidance assistance business device, and executes a collision avoidance action.

A debris removal business device is a business device used by a debris removal business operator that conducts a debris removal business to remove debris in outer space.

When it is foreseen that a space object A will intrude into a range congested with a satellite group, the debris removal business device acquires a danger alert and a collision avoidance action request from a collision avoidance assistance business device, and executes a collision avoidance action.

The debris removal business device executes the functions of the debris removal system or the debris removal program described in the embodiments above.

A satellite business device is a business device that, for example, manages less than 10 satellites.

When it is foreseen that a space object A being managed by the satellite business device will intrude into a range congested with a satellite group, the satellite business device acquires a danger alert and a collision avoidance action request from a collision avoidance assistance business device, and executes a collision avoidance action.

A constellation business device is a business device that manages, for example, a constellation composed of 10 or more satellites.

When it is foreseen that a space object A being managed by the constellation business device will intrude into a range congested with a satellite group, the constellation business device acquires a danger alert and a collision avoidance action request from a collision avoidance assistance business device, and executes a collision avoidance action.

A rocket launch business device is a business device of a business operator that conducts a rocket launch business to launch a rocket.

When it is foreseen that a rocket managed by rocket launch business device will intrude into a range congested with a satellite group or an altitude area where a mega-constellation satellite group flies, the rocket launch business device notifies a flight plan to all or at least one of business devices described below, and requests collision avoidance. Specifically, the rocket launch business device notifies a flight plan to all or at least one of a collision avoidance assistance business device, a mega-constellation business device, and an SSA business device, and requests collision avoidance.

A business device notifies an orbital transfer plan to all or at least one of business devices described below and requests collision avoidance when it is foreseen that a space object A managed by the business device will intrude, in a process of orbital transfer, into a range congested with a satellite group or an altitude area where a mega-constellation satellite group flies. Specifically, the business device notifies an orbital transfer plan to all or at least one of a collision avoidance assistance business device, a mega-constellation business device, and an SSA business device, and requests collision avoidance.

The business device is one of a satellite business device, a constellation business device, and a mega-constellation business device.

Embodiment 5

In this embodiment, differences from Embodiments 1 to 4 or additions to Embodiments 1 to 4 will be mainly described. In this embodiment, components that are substantially the same as those in Embodiments 1 to 4 will be denoted by the same reference signs and description thereof will be omitted.

In this embodiment, an open architecture data repository that discloses orbit information of a space object will be described. In the following, the open architecture data repository may be referred to as an OADR 800. The OADR is an abbreviation for Open Architecture Data Repository.

Specific examples of the OADR 800 will be described below.

Specific Example 1 of the OADR 800

The OADR 800 includes the space information recorder 100 described above.

The OADR 800 includes the space information recorder 100 as a public database. Since the OADR 800 includes the space information recorder 100, there is an effect that information can be shared between business operators and contribution can be made to danger avoidance.

Specific Example 2 of the OADR 800

The OADR 800 may include the collision avoidance assistance system 200 described above.

Specific Example 2 is an arrangement for realizing the OADR 800 in which the collision avoidance assistance system 200 is included so as to contribute to collision avoidance independently. The OADR 800 may include a business device such as an SSA business device that contributes to space situation awareness or a debris removal business device.

When the OADR 800 is constructed as a public institution, danger analysis and evaluation analysis can be carried out taking confidential information into account, and information can be disclosed conditionally by processing orbit information into a state that allows disclosure. Therefore, it is possible to effectively contribute to securing flight safety in space.

Specific Example 3 of the OADR 800

The OADR 800 may be included in the collision avoidance assistance system 200 described above.

Specific Example 3 is an arrangement in which the OADR 800 is constructed as a constituent element of the collision avoidance assistance system 200. Substantially the same effects as those of Specific Example 2 are obtained.

Specific Example 4 of the OADR 800

The OADR 800 shares information with all or at least one of the SSA business device 47, the mega-constellation business device 41, and the debris removal business device 45, and requests that the information management method described above be carried out.

Specific Example 5 of the OADR 800

Figure 26:
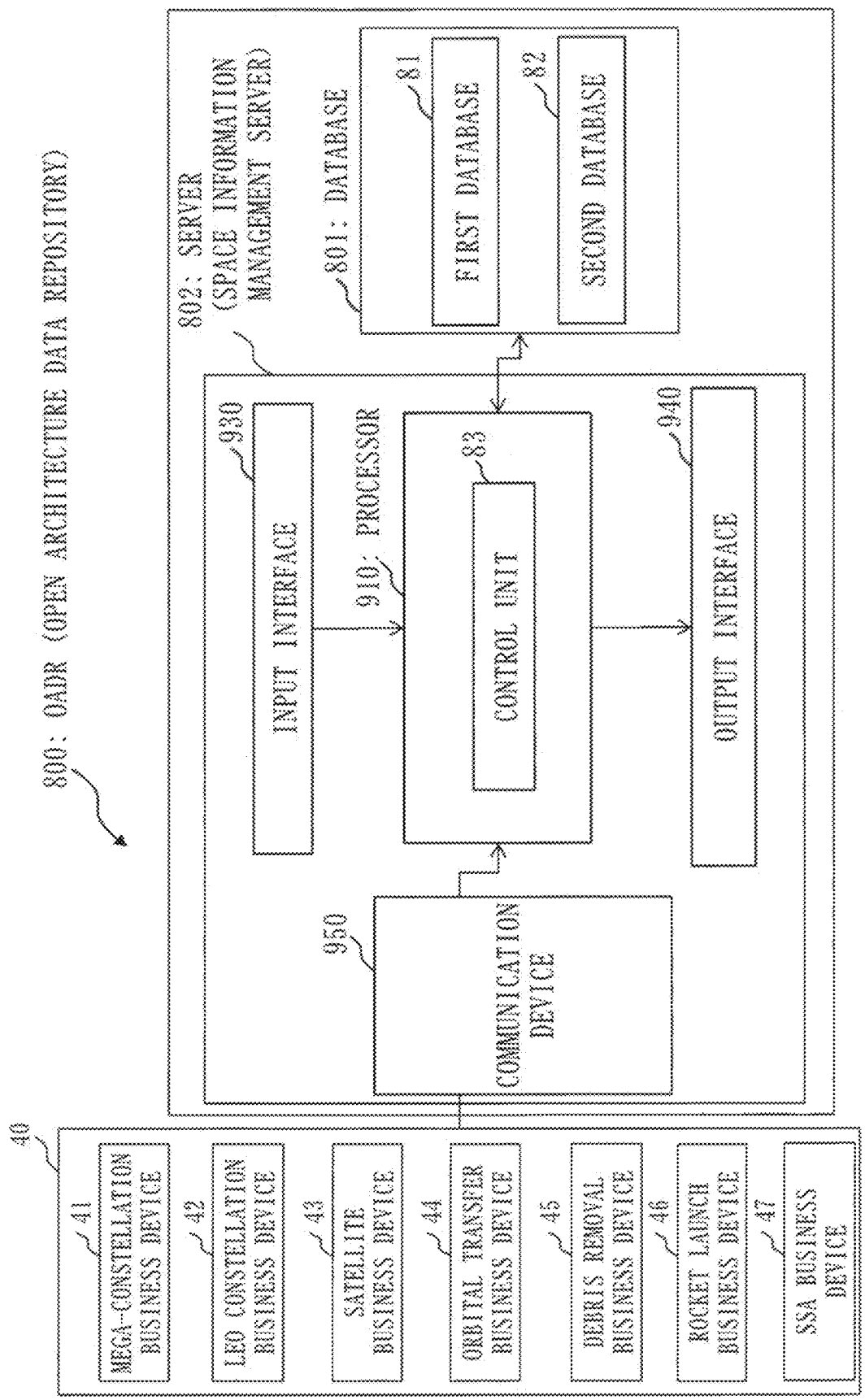
FIG. 26 is a diagram illustrating an example of an OADR according to Embodiment 5.

FIG. 26 is a diagram illustrating an example of the OADR 800 according to this embodiment.

The OADR 800 includes a database 801 to store orbit information of a space object and a space information management server (referred to as a server 802 hereinafter).

The database 801 includes a first database 81 to store non-public information and a second database 82 to store public information.

The server 802 performs danger analysis by referring to the first database 81 and the second database 82, and identifies and manages free public information and chargeable public information in the second database 82. Specifically, the server 802 includes a control unit 83 as a functional element, and the functions of the server 802 are realized by the control unit 83.

Space objects include those whose orbit information is kept non-public due to security needs. When analyzing danger such as proximity or collisions, danger analysis needs to be carried out taking into account non-public information. Therefore, to avoid a risk of information leakage, it is rational to separate databases.

In addition, public information may include free public information and chargeable public information, so that it is necessary to identify and manage these types of information when information is disclosed by the OADR.

Appropriate information management on a need-to-know basis is possible with the OADR by centrally separating non-public data from public data and then identifying and managing chargeable and free public information.

Specific Example 6 of the OADR 800

In Specific Example 6, the server 802 performs danger analysis by referring to the first database 81 and the second database 82, and identifies and manages unconditional public information and conditional public information in the second database 82.

When a particular country constructs the OADR as a public institution, it is rational to disclose information unconditionally to business operators of the country concerned and disclose information conditionally to other business operators.

The following can be set as conditions: a payment requirement, a fee setting, a restriction of disclosed items, a restriction of precision of disclosed information, a restriction of disclosure frequency, non-disclosure to a specific business operator, and so on.

Specific Example 7 of the OADR 800

The OADR 800 includes the collision avoidance assistance business device described above. The OADR 800 discloses space information to all or at least one of the satellite business device 43, the LEO constellation business device 42 (constellation business device), the mega-constellation business device 41, the rocket launch business device 46, the debris removal business device 45, and the SSA business device 47. The OADR 800 may apply Specific Example 7 to other business devices as necessary.

Specific Example 8 of the OADR 800

The OADR 800 discloses space information to all or at least one of the satellite business device 43, the LEO constellation business device 42 (constellation business device), the mega-constellation business device 41, the rocket launch business device 46, the debris removal business device 45, the SSA business device 47, a collision avoidance assistance business device, a space insurance business device 48, which is a business device used by a space insurance business operator, and instructs, requests, or arranges the collision avoidance action described above.

The space insurance business device 48 is the business device used by the space insurance business operator described above.

The OADR 800 may apply Specific Example 8 to other business devices as necessary.

Specific Example 9 of the OADR 800

Figure 27:
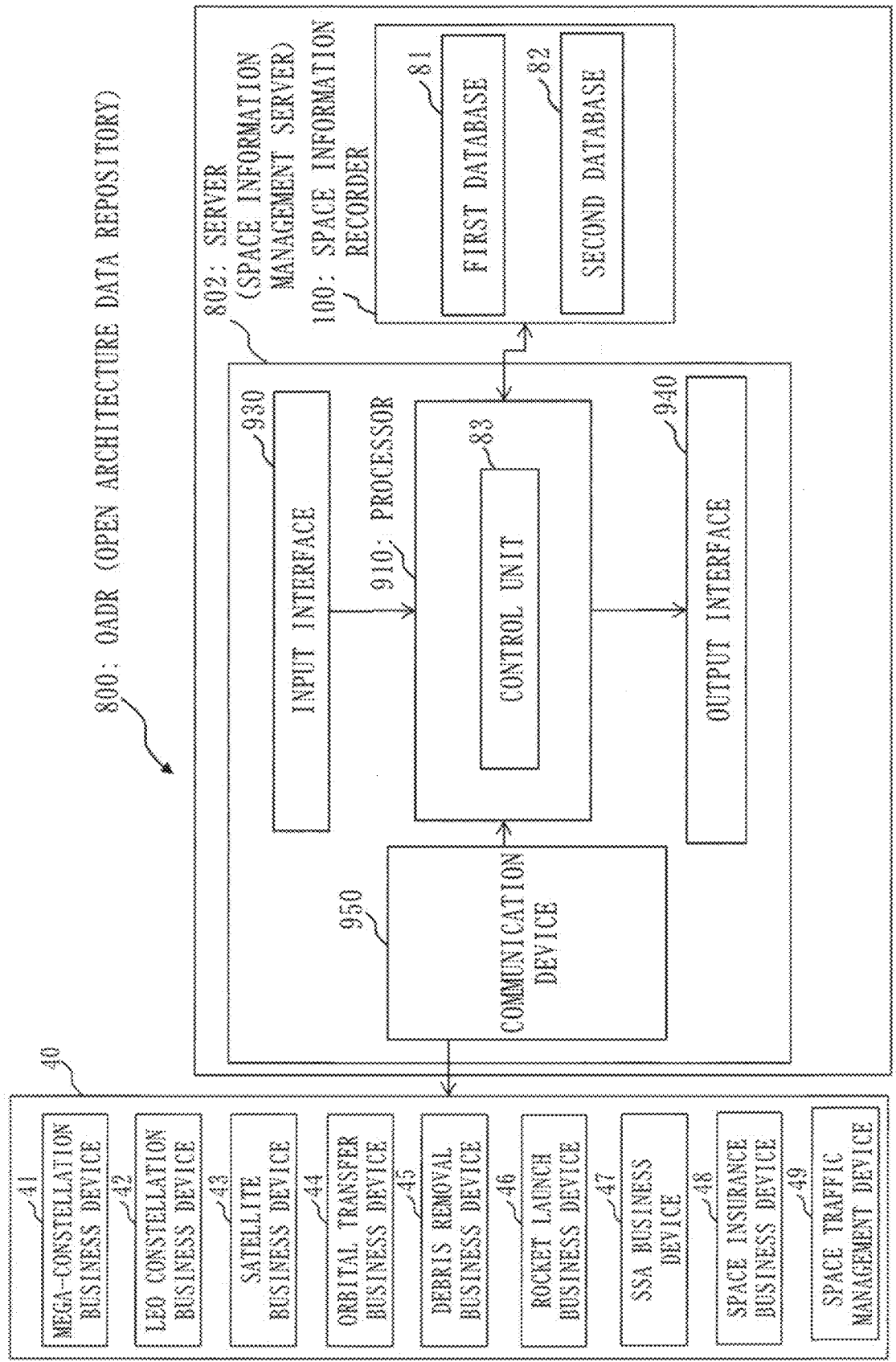
FIG. 27 is a diagram illustrating another example of the OADR according to Embodiment 5.

FIG. 27 is a diagram illustrating another example of the OADR 800 according to this embodiment.

The OADR 800 includes the space information recorder 100 described above and the server 802.

The space information recorder 100 includes the first database 81 to store public information and the second database 82 to store non-public information.

The server 802 acquires space object information including non-public information from all or at least one of a space traffic management device 49 provided in the CSpOC, the SSA business device 47, a collision avoidance assistance business device, the mega-constellation business device 41, and the debris removal business device 45, and stores the space object information in the second database 82. The server 802 generates conditional public information for which a disclosure recipient and disclosure content are restricted and stores the conditional public information in the first database 81. The server 802 transmits the conditional public information to only a specific business device among the SSA business device 47, the collision avoidance assistance business device, the mega-constellation business device 41, the debris removal business device 45, and the space insurance business device 48.

The OADR 800 may apply Specific Example 9 to other business devices as necessary.

A space traffic management device is a device that continues to monitor space objects so as to perform space traffic management. For example, the space traffic management device exists as a system in which the CSpOC in the United States continues to monitor space objects and issues an alert when proximity or a collision between space objects is foreseen.

Confidential information on space objects that is held by the CSpOC and contributes to security may be disclosed only to the OADR. However, proximity and collision risks need to be analyzed and foreseen by taking confidential information into account.

By processing confidential information into information that can be disclosed conditionally and then sharing conditional public information that contributes to collision assistance with only a business device involved in a risk of collision, even a private business operator can carry out a collision avoidance action.

In addition, with regard to space object information held by private business operators, if the OADR similarly processes space object information that cannot be generally disclosed into information that can be disclosed conditionally, collision avoidance becomes possible.

The functions and effects of the OADR 800 according to this embodiment will be described further below.

Consideration is being given to securing flight safety for space objects by constructing a public information system called an OADR so as to share information among business operators.

When the OADR is constructed as a public institution for international cooperation, an authority for issuing an instruction or a request across a national border may be given to a business operator.

For example, to centrally manage orbit information of space objects held by business operators around the world, it is rational if an instruction or request to provide orbit information to the OADR can be made under rules based on an international consensus.

When a particular country constructs the OADR as a public institution, an authority to issue an instruction or request may be given to a business operator in the country concerned.

It may be arranged such that information is disclosed unconditionally to business operators of the country concerned and information is disclosed conditionally to other business operators.

The following can be set as disclosure conditions: a payment requirement, a fee setting, a restriction of disclosed items, a restriction of precision of disclosed information, a restriction of disclosure frequency, non-disclosure to a specific business operator, and so on.

For example, a difference between free and chargeable or a difference in fee for acquiring information may arise between the country concerned and other countries, and the setting of disclosure conditions by the OADR creates a system of space traffic management and has influence in terms of industrial competitiveness.

It is rational that confidential information on space objects that contributes to security is held by the OADR constructed as a public institution by a nation and is not disclosed to third parties. For this reason, the OADR may include a database to store non-public information in addition to a database for the purpose of information disclosure.

Space object information held by a private business operator includes information that cannot be disclosed generally due to corporate secrets or information that is not appropriate to be disclosed in the light of the amount of information or update frequency due to constant maneuver control.

When danger analysis and analytical evaluation related to proximity and collisions between space objects are to be performed, it is necessary to take into account orbit information of all space objects regardless of whether or not space objects require confidentiality.

For this reason, it is rational that the OADR as a public institution carries out danger analysis taking confidential information into account, and as a result of analytical evaluation, discloses information conditionally as described below. For example, when danger is foreseen, the OADR processes information to allow disclosure and then discloses information by restricting a disclosure recipient or disclosure content, such as disclosing only orbit information of a time period for which the danger is foreseen to a disclosure recipient that will contribute to avoiding the danger.

If the number of objects in orbit increases and the risk of proximity and collision increases in the future, various danger avoidance measures will be necessary, such as a measure in which a debris removal business operator removes dangerous debris and a measure in which a mega-constellation business operator changes an orbital location or passage timing to avoid a collision. If the OADR that is a public institution can instruct or request a business operator to execute a danger avoidance action, a significant effect can be expected in securing flight safety in space.

In such a case in which it is foreseen that a space object managed by an emerging country, a venture business operator, or a university that has little experience in space business and lacks information that contributes to danger avoidance will intrude into an orbital altitude zone in which a mega-constellation flies, danger avoidance can be effected promptly and effectively by the OADR acting as an intermediary to transmit information to business operators as required.

By executing a danger avoidance measure and arranging or introducing space insurance for a private business operator, contribution can be made to the promotion and industrialization of space traffic management.

Arrangements for realizing the OADR include an arrangement in which only a public database is included and an arrangement in which danger analysis means, collision avoidance assistance means, or SSA means is provided to independently contribute to danger avoidance. There are also various possibilities, such as an arrangement that contributes to danger avoidance by information management through instructing, requesting, acting as an intermediary for, or making introductions to business operators.

When an SSA business operator performs collision prediction analysis of debris and finds a risk of proximity or collision with a satellite belonging to a mega-constellation, it is rational to determine an avoidance action as described below. Unlike a proximity or collision alert to an individual satellite such as a satellite in general, an intrusion alert is issued to a mega-constellation business operator as a forecast for passage through the orbital altitude of the mega-constellation, and the mega-constellation business operator identifies the satellite concerned and determines an avoidance action.

Similarly, with regard to an alert for a congested area such as a congested orbital plane or a polar region, it is rational to create a system in which an intrusion alert for the congested area is issued and a counter measure action may be delegated to a debris removal business operator. In the embodiments above, the space information recorder and the OADR such that the space information recorder includes means for issuing an alert by the SSA business operator when debris is to intrude into a specific altitude or a congested area have been described.

In Embodiments 1 to 5 above, each unit that is a functional element of each device and each system has been described as an independent block. However, the configurations of each device and each system may be different from the configurations described in the above embodiments. The functional blocks of each device and each system may be arranged in any configuration, provided that the functions described in the above embodiments can be realized. Each device and each system may be one device or a system composed of a plurality of devices.

Portions of Embodiments 1 to 5 may be implemented in combination. Alternatively, one portion of these embodiments may be implemented. These embodiments may be implemented as a whole or partially in any combination.

That is, in Embodiments 1 to 5, portions of Embodiments 1 to 5 may be freely combined, any of the constituent elements may be modified, or any of the constituent elements may be omitted in Embodiments 1 to 5.

The embodiments described above are essentially preferable examples and are not intended to limit the scope of the present disclosure, the scope of applications of the present disclosure, and the scope of uses of the present disclosure. The embodiments described above can be modified in various ways as necessary.

REFERENCE SIGNS LIST

20: satellite constellation; 21: orbital plane; 30: satellite; 30a: debris removal satellite; 31: satellite control device; 32: satellite communication device; 33: propulsion device; 34: attitude control device; 35: power supply device; 36: capture device; 40: management business device; 41: mega-constellation business device; 42: LEO constellation business device; 43: satellite business device; 44: orbital transfer business device; 45: debris removal business device; 46: rocket launch business device; 47: SSA business device; 51: orbit forecast information; 52: satellite orbit forecast information; 53: debris orbit forecast information; 200: collision avoidance assistance system; 210: notification receiving unit; 220: danger notification unit; 230: collision avoidance selection unit; 240: danger alert output unit; 400: debris removal system; 501: proximity alert: 502: collision alert; 511: space object ID; 512: forecast epoch; 513: forecast orbital elements; 514: forecast error; 60: space object; 61: public orbit information; 70: Earth; 100: space information recorder; 110: determination unit; 111, 503, 504, 505: intrusion alert; 120: issuance unit: 140: storage unit: 191: control unit; 55: orbit control command; 56: control command; 57: capture command: 301: satellite orbit area: 500: space object information: 600: satellite constellation forming system; 11, 11b: satellite constellation forming unit; 300: satellite group: 700, 701,702: ground facility; 510: orbit control command generation unit; 520: analytical prediction unit; 909: electronic circuit; 910: processor; 921: memory; 922: auxiliary storage device; 930: input interface; 940: output interface; 941: display device; 950: communication device; 800: OADR; 801: database: 802: server; 81: first database: 82: second database; 83: control unit: 48: space insurance business device; 49: space traffic management device.

The invention claimed is:

1. A space information recorder comprising:
processing circuitry configured to;
acquire and record space object information, the space object information being acquired from a management business device used by a management business operator that manages a plurality of space objects flying in space and being orbit predicted information of the plurality of space objects that includes a predicted epoch of each of the plurality of space objects, a predicted orbital element of each of the plurality of space objects, and a predicted error of each of the plurality of space objects, and when it is foreseen that a space object included in the plurality of space objects will intrude into a range at orbital altitudes of 300 km to 1000 km in which a satellite group of local sun time (LST) 10:00 to 11:00 is present as determined based upon the orbit predicted information that includes the predicted epoch, the predicted orbital element, and the predicted error, record a time period from intrusion to exit and the orbit forecast predicted information.

2. A space information recorder comprising:
processing circuitry configured to:
acquire and record space object information, the space object information being acquired from a management business device used by a management business operator that manages a plurality of space objects flying in space and being orbit forecast predicted information of the plurality of space objects that includes a predicted epoch of each of the plurality of space objects, a predicted orbital element of each of the plurality of space objects, and a predicted error of each of the plurality of space objects, and when it is foreseen that a space object included in the plurality of space objects will intrude into a range at latitudes of 80 and more degrees north or latitudes of 80 and more degrees south and at orbital altitudes of 300 km to 1000 km that is congested with a polar orbit satellite group as determined based upon the orbit predicted information that includes the predicted epoch, the predicted orbital element, and the predicted error, record a time period from intrusion to exit and the orbit predicted information.

3. A space information recorder comprising:

processing circuitry configured to;

acquire and record space object information, the space object information being acquired from a management business device used by a management business operator that manages a plurality of space objects flying in space and being orbit predicted information of the plurality of space objects; and record, as orbit information, an upper limit value and a lower limit value of an orbital altitude of a constellation satellite group flying at a same nominal altitude and cooperatively realizing a single mission, the upper limit value and the lower limit value being acquired from a management business device of a satellite group belonging to a mega-constellation forming system that forms a mega-constellation composed of 100 or more satellites.

4. The space information recorder according to claim 3, wherein the orbit predicted information includes a predicted epoch of each of the plurality of space objects, a predicted orbital element of each of the plurality of space objects, and a forecast predicted error of each of the plurality of space objects, and wherein when it is foreseen that a space object included in the plurality of space objects will intrude into an orbital altitude zone and a latitude zone in which a satellite group constituting the mega-constellation is present as determined based upon the orbit predicted information that includes the predicted epoch, the predicted orbital element, and the predicted error, the processing circuitry is configured to record a time period from intrusion to exit and the orbit predicted information.

5. The space information recorder according to claim 3, wherein the orbit predicted information includes a predicted epoch of each of the plurality of space objects, a predicted orbital element of each of the plurality of space objects, and a predicted error of each of the plurality of space objects, and wherein when a space object included in the plurality of space objects is a rocket and it is foreseen that the space object while being launched will intrude into an orbital altitude zone and a latitude zone in which a satellite group is present as determined based upon the orbit predicted information that includes the predicted epoch, the predicted orbital element, and the predicted error, the processing circuitry is configured to record a time period from intrusion to exit and the orbit predicted information.

6. The space information recorder according to claim 3, wherein the orbit predicted information includes a predicted epoch of each of the plurality of space objects, a predicted orbital element of each of the plurality of space objects, and a predicted error of each of the plurality of space objects, and wherein when a space object included in the plurality of space objects is a space object in a process of deorbiting and it is foreseen that the space object in the process of deorbiting will intrude into an orbital altitude zone and a latitude zone in which a satellite group is present as determined based upon the orbit predicted information that includes the predicted epoch, the predicted orbital element, and the predicted error, the processing circuitry is configured to record a time period from intrusion to exit and the orbit forecast predicted information.

7. The space information recorder according to claim 3, wherein the orbit predicted information includes a predicted epoch of each of the plurality of space objects, a predicted orbital element of each of the plurality of space objects, and a predicted error of each of the plurality of space objects, and wherein when a space object included in the plurality of space objects is a space object in a process of orbital transfer and it is foreseen that the space object in the process of orbital transfer will intrude into an orbital altitude zone and a latitude zone in which a satellite group is present as determined based upon the orbit predicted information that includes the predicted epoch, the predicted orbital element, and the predicted error, the processing circuitry is configured to record a time period from intrusion to exit and the orbit predicted information.

8. The space information recorder according to claim 3, wherein the processing circuitry is configured to issue an intrusion alert when it is foreseen that another space object will intrude into an orbital altitude zone and a latitude zone in which a satellite group is present.

9. The space information recorder according to claim 3, wherein the space object information includes orbit record information including;

a collision occurrence time estimated by post-accident verification after occurrence of a collision accident between a first space object and a second space object that are included in the plurality of space objects, location information of the first space object at or immediately before the collision occurrence time, and location information of the second space object at or immediately before the collision occurrence time.

10. A space situation awareness (SSA) business device comprising wherein the space information recorder is the space information recorder according to claim 3.

11. An open architecture data repository to disclose orbit information of a space object of the plurality of space objects, the open architecture data repository comprising the space information recorder according to claim 3.

12. The open architecture data repository according to claim 11, comprising:

a database to store the orbit information of the space object, and a space information management server, wherein the database includes a first database to store non-public information and a second database to store public information, and wherein the space information management server performs danger analysis by referring to the first database and the second database, and identifies and manages free public information and chargeable public information in the second database.

13. The open architecture data repository according to claim 11, comprising:

a database to store the orbit information of the space object, and a space information management server, wherein the database includes a first database to store non-public information and a second database to store public information, and wherein the space information management server performs danger analysis by referring to the first database and the second database, and identifies and manages unconditional public information and conditional public information in the second database.

14. An open architecture data repository to disclose orbit information of a space object of the plurality of space objects comprising:

the space information recorder according to claim 3; and a server, wherein the space information recorder includes a first database to store public information and a second database to store non-public information, and wherein the server acquires the space object information including non-public information from all or at least one of a space traffic management device that continues monitoring of the space object and performs space traffic management, a space situation awareness (SSA) business device, a collision avoidance assistance business device, a mega-constellation business device, or a debris removal business device, stores the space object information in the second database, generates conditional public information for which a disclosure recipient and disclosure content are restricted, stores the conditional public information in the first database, and transmits the conditional public information to only a specific business device among the SSA business device, the collision avoidance assistance business device, the mega-constellation business device, the debris removal business device, and a space insurance business device that is a business device of a space insurance business operator.

15. A space information recorder comprising:

circuitry configured to:

acquire and record space object information, the space object information being acquired from a management business device used by a management business operator that manages a plurality of space objects flying in space and being orbit predicted information of the plurality of space objects, and record, as orbit information, an upper limit value and a lower limit value of an orbital inclination of a constellation satellite group flying at a same nominal altitude and cooperatively realizing a single mission, the upper limit value and the lower limit value being acquired from a management business device of a satellite group belonging to a mega-constellation forming system that forms a mega-constellation composed of 100 or more satellites.

16. A space information recorder comprising:

processing circuitry configured to:

acquire, from a management business device used by a management business operator that manages a plurality of space objects flying in space, flight prediction information indicating a flight prediction for each of the plurality of space objects, set orbit predicted information including a predicted epoch of an orbit of each of the plurality of space objects, a predicted orbital element that identifies the orbit of each of the plurality of space objects, and a predicted error that is predicted for the orbit of each of the plurality of space objects based on the acquired flight prediction information, register the orbit predicted information acquired from a mega-constellation business device that manages a mega-constellation composed of 100 or more satellites not as information on individual satellites, and register an orbital altitude and an orbital inclination of a satellite group as orbit information.

17. A space information recorder comprising:

processing circuitry configured to;

acquire, from a management business device used by a management business operator that manages a plurality of space objects flying in space, flight prediction information indicating a flight prediction for each of the plurality of space objects, set orbit predicted information including a predicted epoch of an orbit of each of the plurality of space objects, a predicted orbital element that identifies the orbit of each of the plurality of space objects, and a predicted error that is predicted for the orbit of each of the plurality of space objects, as orbit forecast information, based on the acquired flight prediction information, and issue an intrusion alert when it is foreseen that another space object will intrude into an orbital altitude zone and a latitude zone in which a satellite group constituting a mega-constellation composed of 100 or more satellites is present as determined based upon the orbit predicted information that includes the predicted epoch, the predicted orbital element, and the predicted error.

18. A collision avoidance assistance system to acquire space object information from a space information recorder that records the space object information acquired from a management business device used by a management business operator that manages a plurality of space objects, and assist avoidance of a collision between space objects among the plurality of space objects, the collision avoidance assistance system comprising:

a database to store the space object information acquired from the space information recorder; and a server including processing circuitry to decide a collision avoidance business operator, wherein the processing circuitry is configured to:

receive a notification about foreseen intrusion from the space information recorder when it is foreseen that a space object included in the plurality of space objects will intrude into a range at orbital altitudes of 300 km to 1000 km in which a satellite group of local sun time (LST) 10:00 to 11:00 is present, acquire a time period from the intrusion into the range to exit from the range by the space object and orbit predicted information from the space information recorder, notify a danger alert for the time period to all or at least one of a business operator of the space object, a satellite business operator that owns a satellite flying in the range, or a debris removal business operator, select a candidate for the collision avoidance business operator, and request the collision avoidance business operator to take a collision avoidance action.

19. The collision avoidance assistance system according to claim 18, wherein the processing circuitry:

selects a management business operator of the space object that has a collision avoidance function, and requests the management business operator of the space object to take an intrusion avoidance action to change the time period or an orbit in which intrusion is to be made by the space object.

20. The collision avoidance assistance system according to claim 18, wherein the processing circuitry:
selects the debris removal business operator, and
requests the debris removal business operator to take an intrusion avoidance action to capture the space object and change the time period or an orbit in which intrusion into the range is to be made.

21. A collision avoidance assistance system to acquire space object information from a space information recorder that records the space object information acquired from a management business device used by a management business operator that manages a plurality of space objects, and assist avoidance of a collision between space objects among the plurality of space objects, the collision avoidance assistance system comprising:
a database to store the space object information acquired from the space information recorder; and
a server including processing circuitry to decide a collision avoidance business operator,
wherein the processing circuitry is configured to:
receive a notification about foreseen intrusion from the space information recorder when it is foreseen that a space object included in the plurality of space objects will intrude into a range at latitudes of 80 and more degrees north or latitudes of 80 and more degrees south and at altitudes of 300 km to 1000 km that is congested with a polar orbit satellite group,
acquire a time period from the intrusion into the range to exit from the range by the space object and orbit predicted information from the space information recorder,
notify a danger alert for the time period concerned to all or at least one of a business operator of the space object, a satellite business operator that owns a satellite flying in the range, or a debris removal business operator,
select a candidate for the collision avoidance business operator, and
request the collision avoidance business operator to take a collision avoidance action.

22. A collision avoidance assistance system to acquire space object information from a space information recorder that records space object information acquired from a management business device used by a management business operator that manages a plurality of space objects, and assist avoidance of a collision between space objects among the plurality of space objects, the collision avoidance assistance system comprising:
a database to store the space object information acquired from the space information recorder; and
a server including processing circuitry to decide a collision avoidance business operator,
wherein the processing circuitry is configured to:
receive a notification about foreseen intrusion from the space information recorder when it is foreseen that a space object included in the plurality of space objects will intrude into an orbital altitude zone and a latitude zone in which a satellite group constituting a mega-constellation composed of 100 or more satellites is present,
acquire a time period from the intrusion into the range to exit from the range by the space object and orbit predicted information from the space information recorder,
notify a danger alert for the time period concerned to all or at least one of a business operator of the space object, a mega-constellation business operator, or a debris removal business operator,
select a candidate for the collision avoidance business operator, and
request the collision avoidance business operator to take a collision avoidance action.

23. The collision avoidance assistance system according to claim 22, wherein the processing circuitry;
selects the mega-constellation business operator, and
requests the mega-constellation business operator to take an action to avoid a collision between a satellite group constituting a mega-constellation and the space object.

24. A space situation awareness (SSA) business device comprising a space information recorder, the space information recorder acquiring, from a management business device that manages a plurality of space objects flying in space, orbit predicted information of the plurality of space objects and recording the orbit predicted information,
wherein the space information recorder executes the collision avoidance assistance system according to claim 22.

25. An open architecture data repository to disclose orbit information of a space object, the open architecture data repository comprising the collision avoidance assistance system according to claim 22.

26. An open architecture data repository to disclose orbit information of a space object, the open architecture data repository being included in the collision avoidance assistance system according to claim 22.

* * * * *